United States Patent [19]
Asano et al.

[11] Patent Number: 6,124,866
[45] Date of Patent: Sep. 26, 2000

[54] MULTIPROCESSOR SYSTEM WITH UNIT PROCESSORS ASSIGNED A PLURALITY OF NON-CONTIGUOUS REGIONS

[75] Inventors: Kenichi Asano; Ryuta Suzuki, both of Kanagawa-ken, Japan

[73] Assignee: Mitsubishi Denki Kabushiki Kaisha, Tokyo, Japan

[21] Appl. No.: 08/150,548

[22] Filed: Nov. 9, 1993

Related U.S. Application Data

[63] Continuation of application No. 07/521,827, May 10, 1990, abandoned.

[30] Foreign Application Priority Data

| May 10, 1989 | [JP] | Japan | 1-117109 |
| May 17, 1989 | [JP] | Japan | 1-123329 |
| Sep. 27, 1989 | [JP] | Japan | 1-251047 |
| Oct. 19, 1989 | [JP] | Japan | 1-274404 |

[51] Int. Cl.[7] ................................................ G06F 15/80
[52] U.S. Cl. .......................... 345/505; 348/721; 382/304; 709/105
[58] Field of Search ..................... 395/163, 200, 395/650; 348/721; 345/505; 382/304; 709/105

[56] References Cited

U.S. PATENT DOCUMENTS

| 4,414,624 | 11/1983 | Summer, Jr. et al. | 712/21 |
| 4,635,292 | 1/1987 | Mori et al. | 382/304 |
| 4,805,227 | 2/1989 | Wehner | 382/303 |
| 4,942,470 | 7/1990 | Nishitani et al. | 348/726 |
| 4,979,096 | 12/1990 | Ueda et al. | 709/248 |
| 5,010,515 | 4/1991 | Torborg, Jr. | 345/505 |
| 5,129,092 | 7/1992 | Wilson | 712/16 |
| 5,136,662 | 8/1992 | Maruyama et al. | 382/308 |

OTHER PUBLICATIONS

"A DSP Architecture for 64 KBPS Motion Video Codec" Tokumichi Murakami, IEEE ISCAS 1988 p. 227–230.

"A DSP Architecture Design for Low Bit–Rate Motion Video Codec" Tokumichi Murakami, IEEE Trans. on Circuits & Systems vol. 36, No. 10, Oct. 1989 p. 1267–1274.

Ohta et al, "Performance of a Multicomputer Type DSP System NOVI for Motion Picture Coding" 1988 IEEE International Symposium on Circuits and Systems vol. 3, Jun. 1988, Helsinky University of Technology.

Murakami et al, "A DSP Architecture for 64KBPS Motion Video Codec" 1988 IEEE International Symposium on Circuits and Systems vol. 1, Jun. 1988, Helsinky University of Technology.

*Primary Examiner*—Kenneth S. Kim

[57] ABSTRACT

An image processor has a plurality of unit processors, each of which are assigned specific non-contiguous frame regions. All of the unit processors simultaneously start processing input partial image signals after all of the signals corresponding to the assigned frame regions have been fetched.

8 Claims, 21 Drawing Sheets

SINGLE-DMM MODULE ARRANGEMENT OF MULTIPROCESSOR TYPE TIME VARYING IMAGE ENCODING SYSTEM

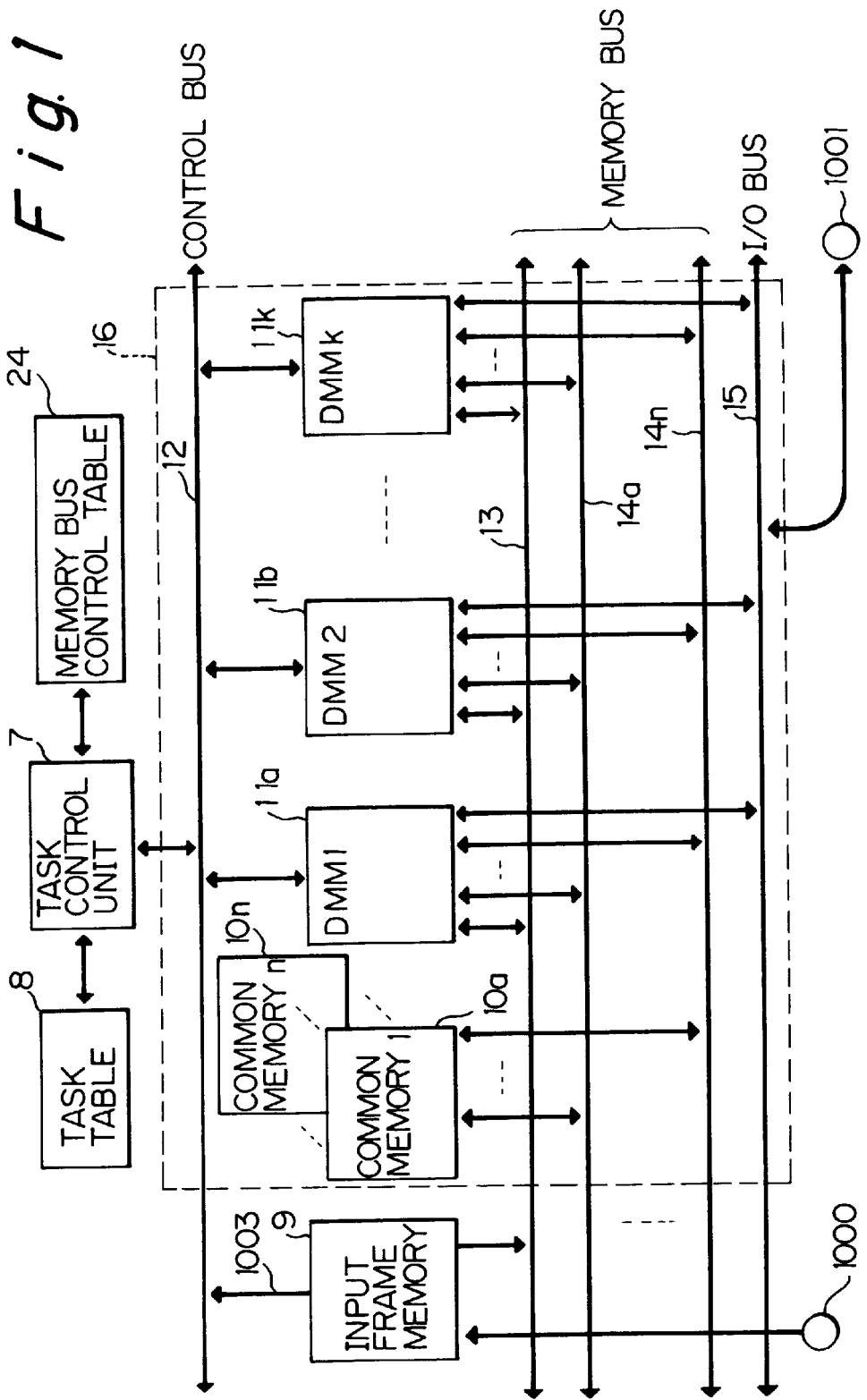

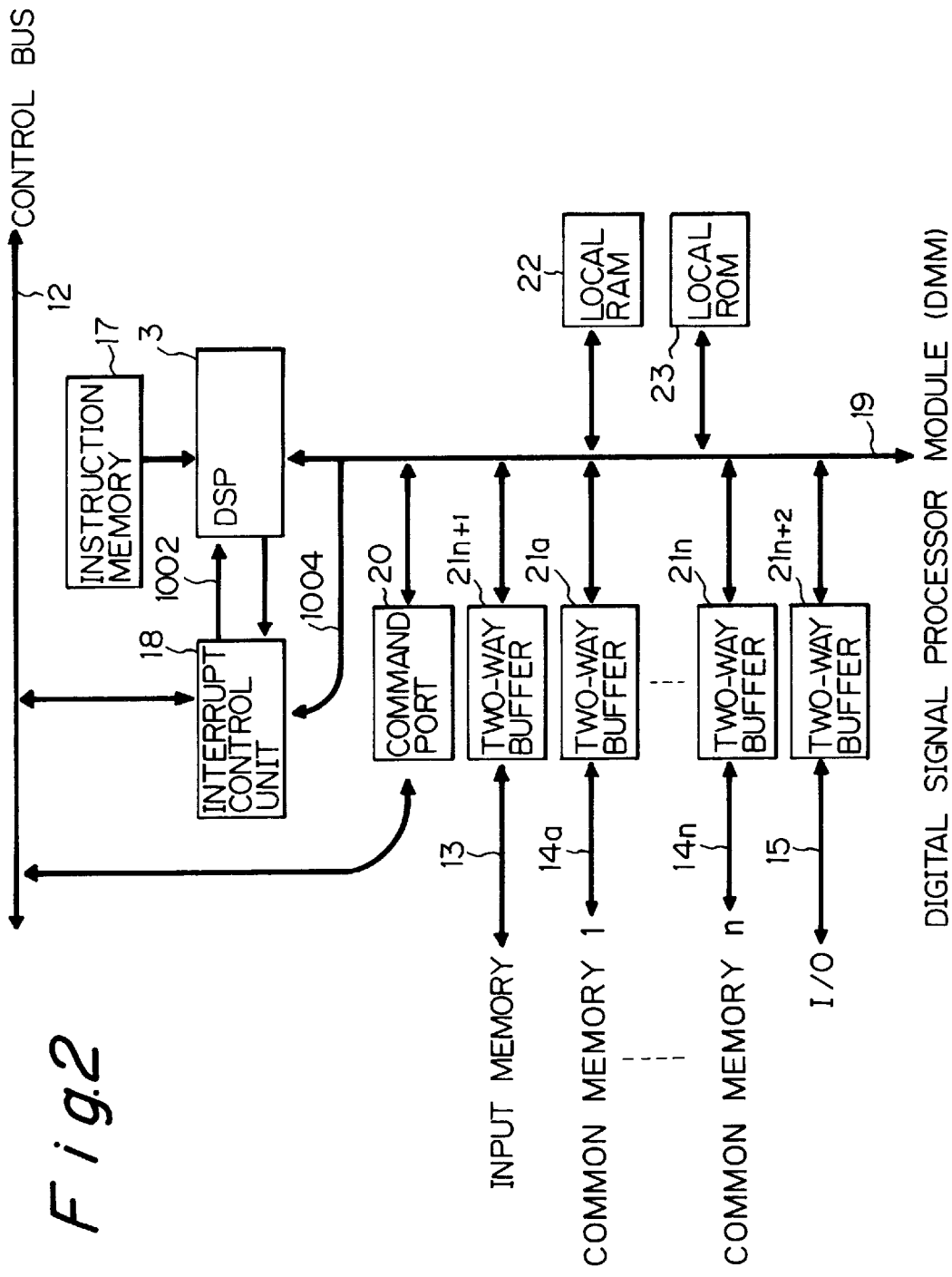

OPERATION EXAMPLE OF DMM

OPERATION EXAMPLE OF DMM

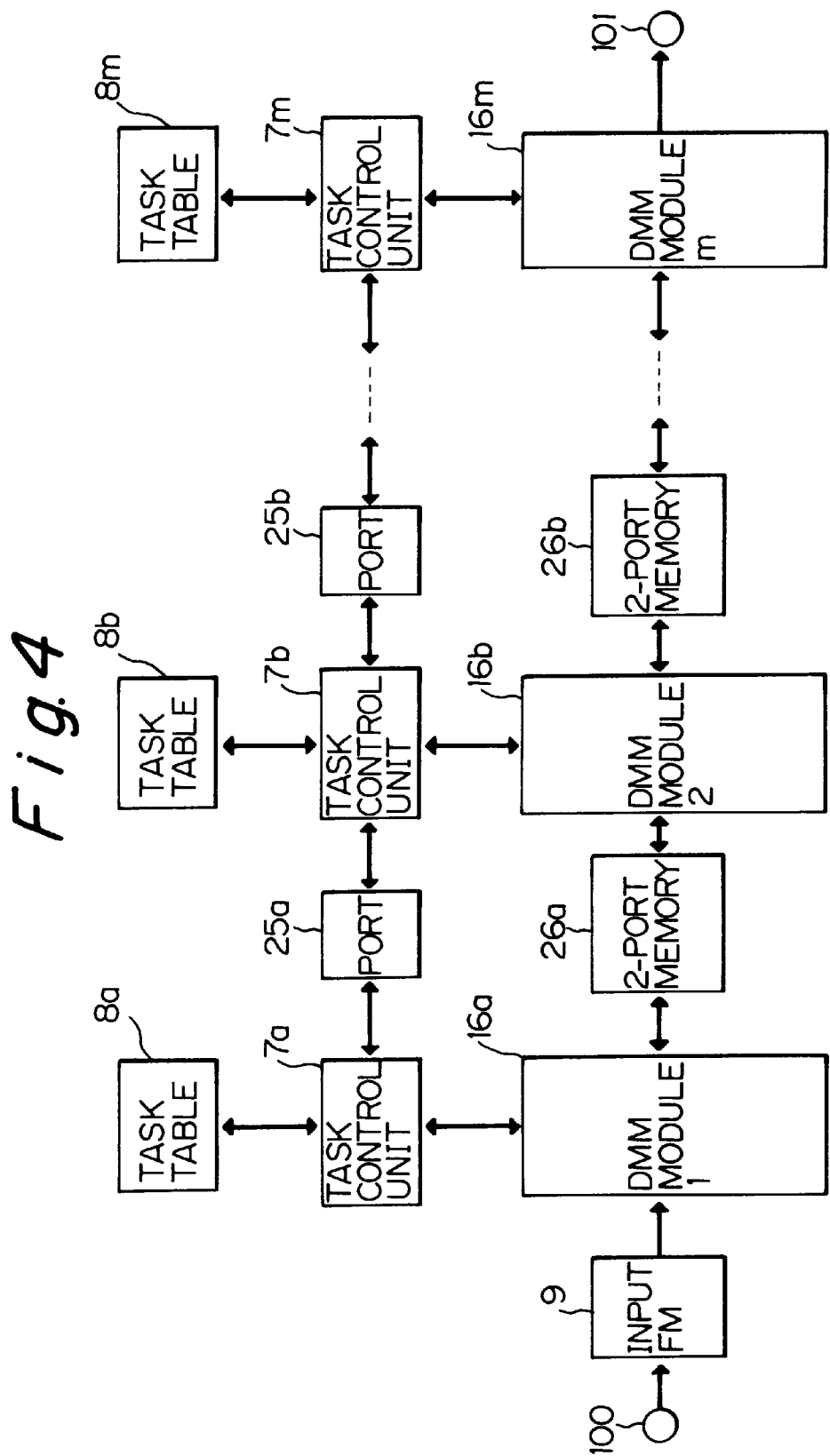

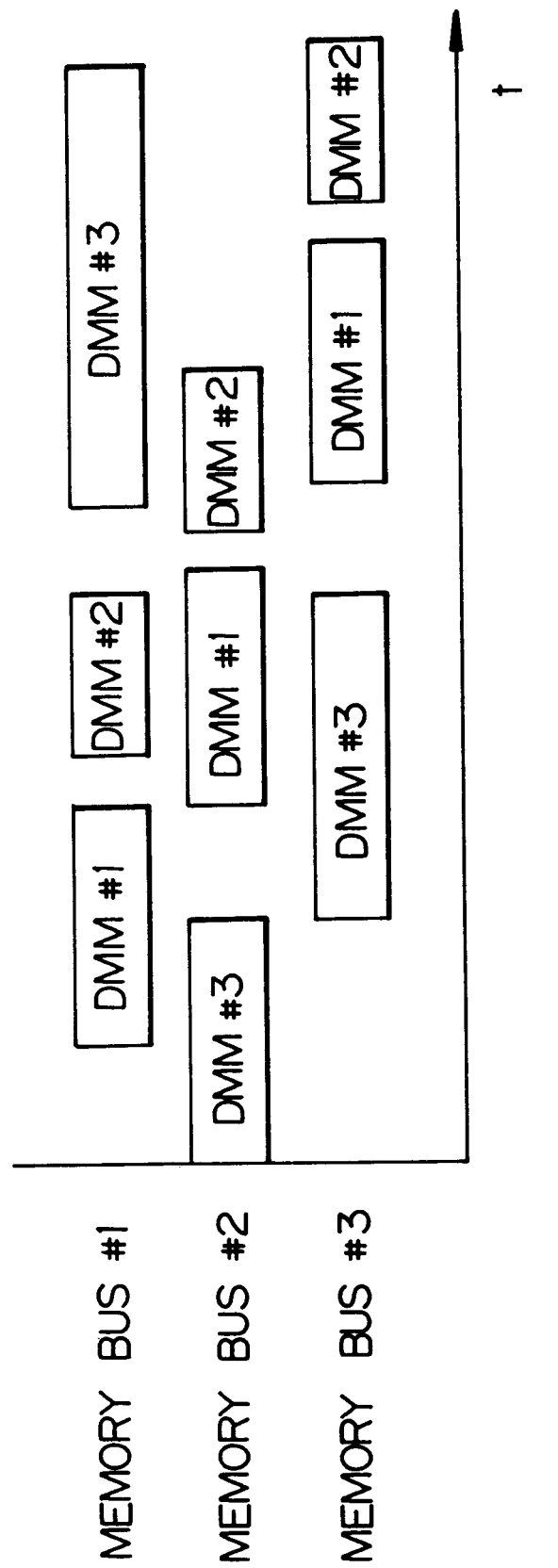

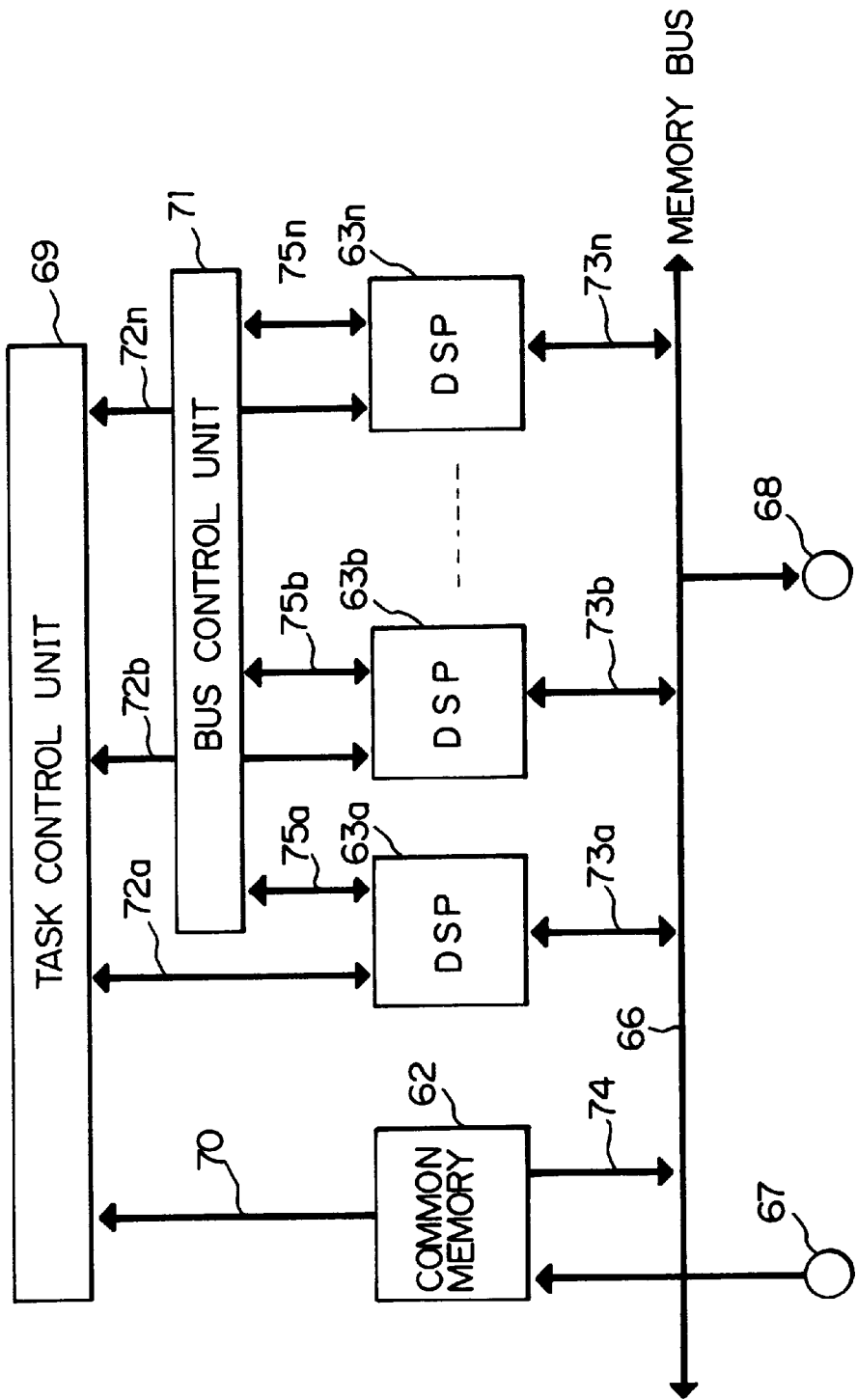

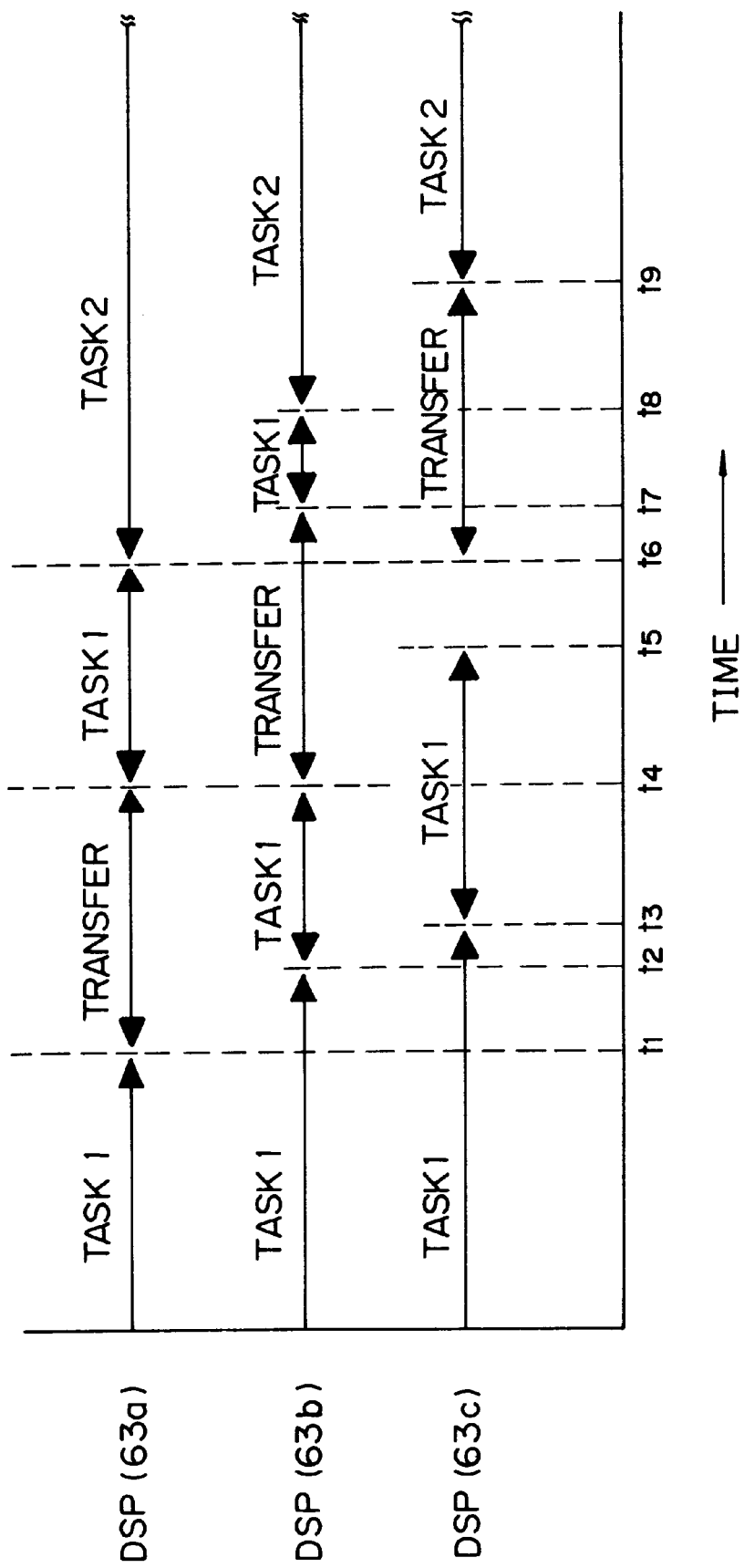

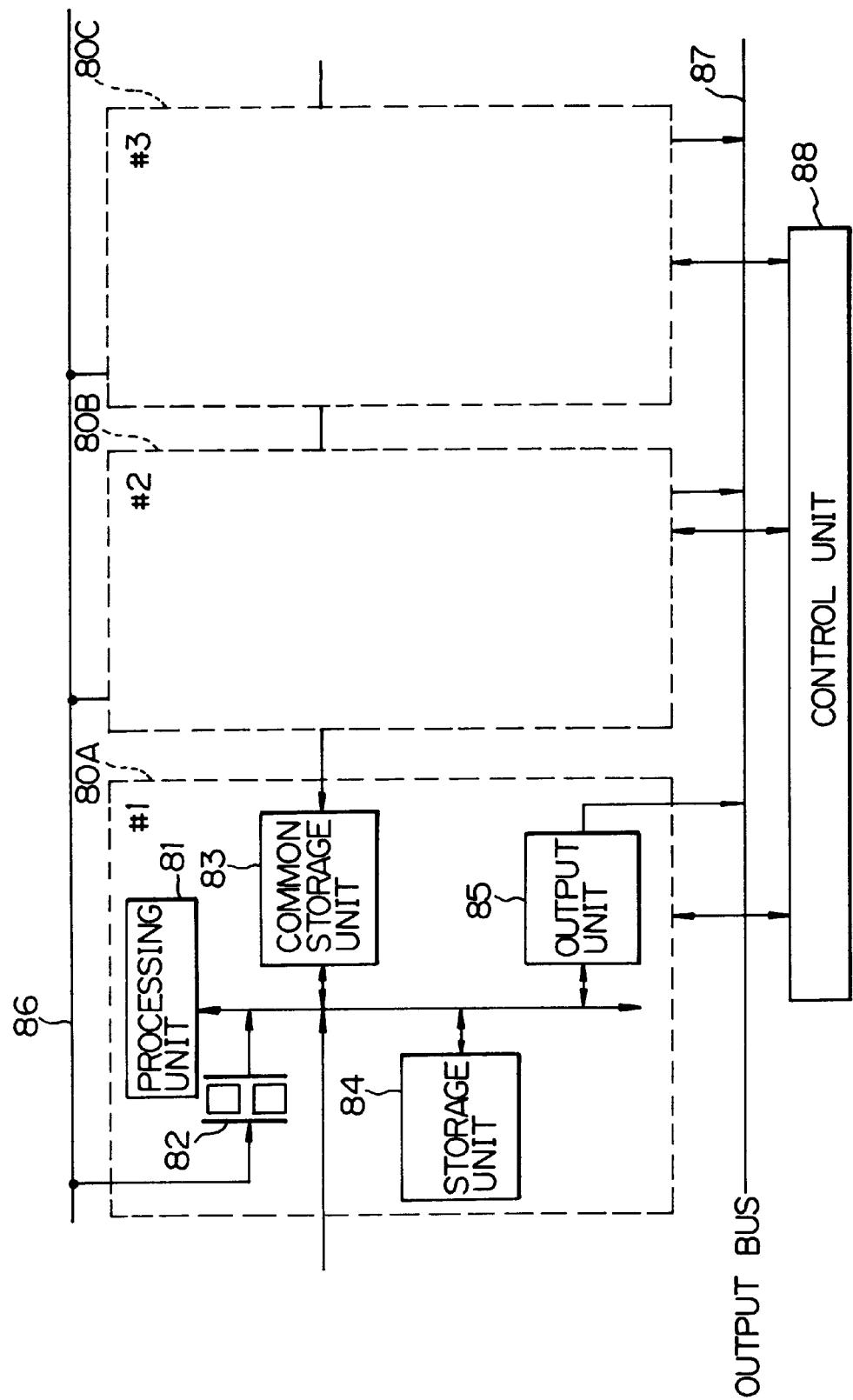

Fig.11

| SECTIONAL FRAME NO | |
|---|---|
| 1 | #1 |
| 2 | #2 |
| 3 | #3 |
| 4 | #1 |
| 5 | #2 |
| 6 | #3 |
| 7 | #1 |
| 8 | #2 |
| 9 | #3 |

Fig. 14

| |
|---|
| SECTIONAL FRAME NO.1 CODED/DECODED SIGNAL |
| EMPTY |
| EMPTY |
| SECTIONAL FRAME NO.4 CODED/DECODED SIGNAL |
| EMPTY |
| EMPTY |
| SECTIONAL FRAME NO.7 CODED/DECODED SIGNAL |
| EMPTY |
| EMPTY |

Fig. 15

| |
|---|
| SECTIONAL FRAME NO.1 CODED/DECODED SIGNAL |
| SECTIONAL FRAME NO.2 CODED/DECODED SIGNAL |
| SECTIONAL FRAME NO.3 CODED/DECODED SIGNAL |
| SECTIONAL FRAME NO.4 CODED/DECODED SIGNAL |
| SECTIONAL FRAME NO.5 CODED/DECODED SIGNAL |
| SECTIONAL FRAME NO.6 CODED/DECODED SIGNAL |
| SECTIONAL FRAME NO.7 CODED/DECODED SIGNAL |
| SECTIONAL FRAME NO.8 CODED/DECODED SIGNAL |
| SECTIONAL FRAME NO.9 CODED/DECODED SIGNAL |

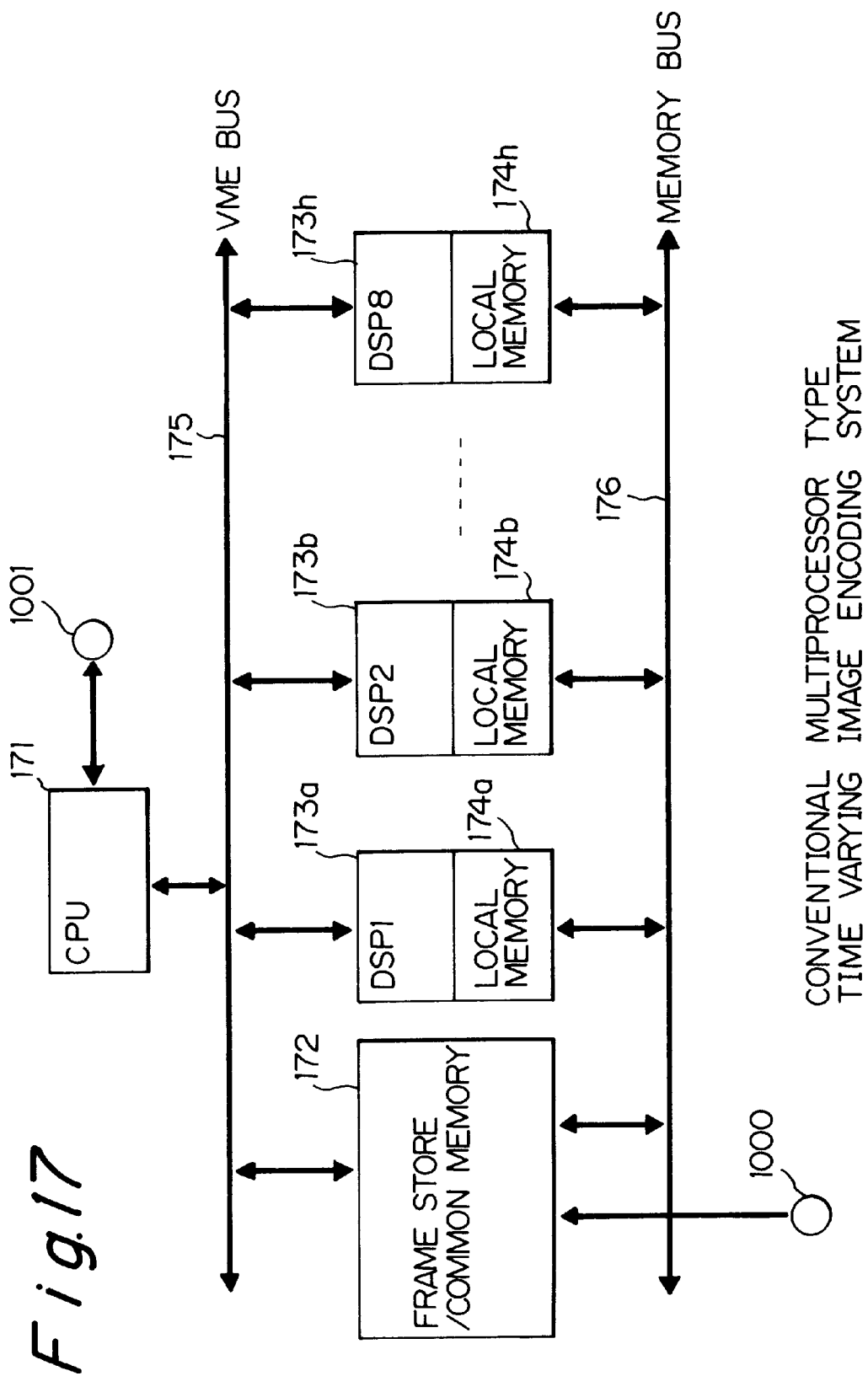
Fig.17   CONVENTIONAL MULTIPROCESSOR TYPE TIME VARYING IMAGE ENCODING SYSTEM

|          | DSP #1 | DSP #2 | DSP #3 |
|----------|--------|--------|--------|
| REGION 1 | A1     | B1     | C1     |
| REGION 2 | A2     | B2     | C2     |
| REGION 3 | A3     | B3     | C3     |

OPERATION EXAMPLE OF PRIOR ART

OPERATION EXAMPLE OF PRIOR ART

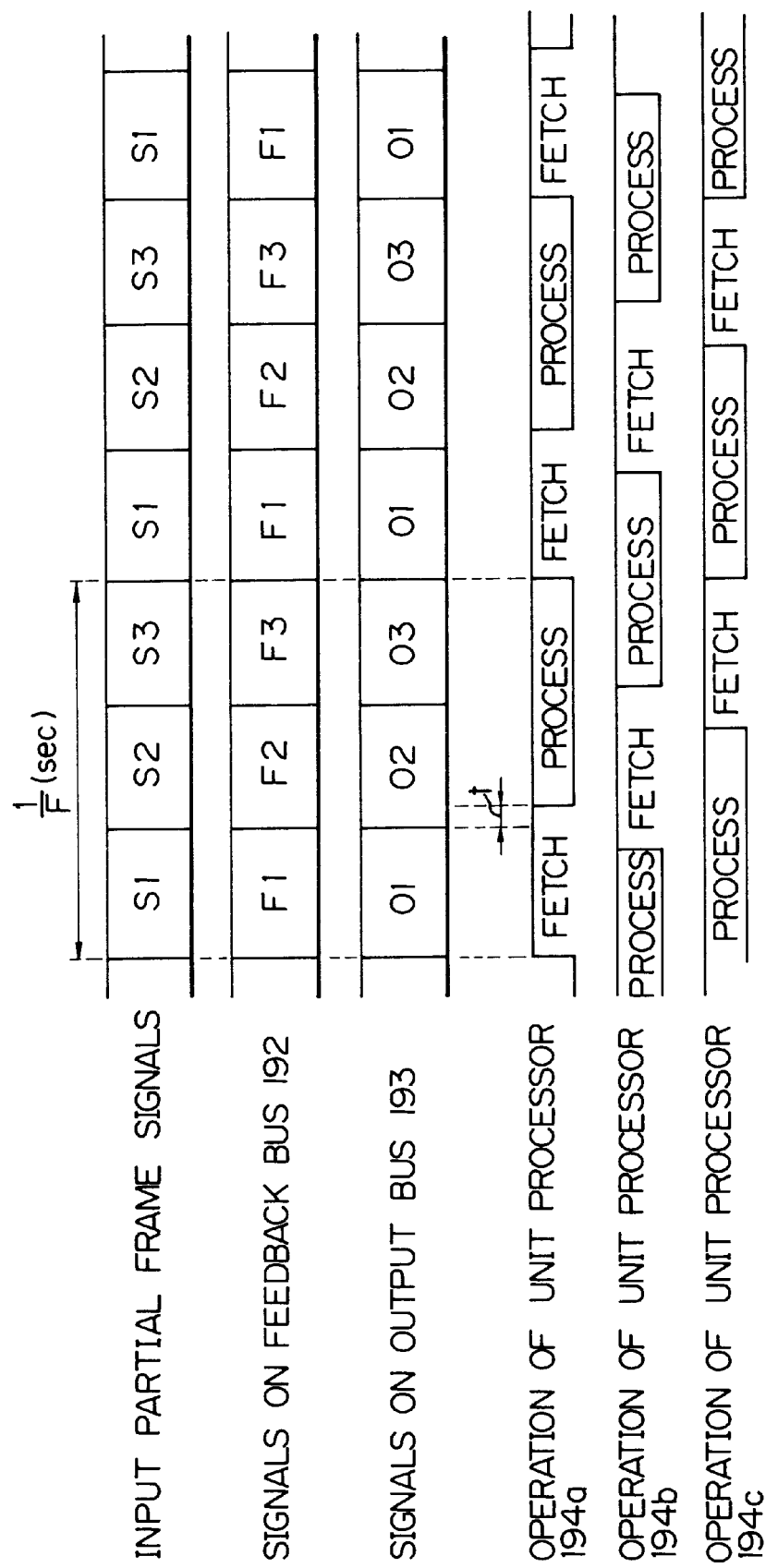

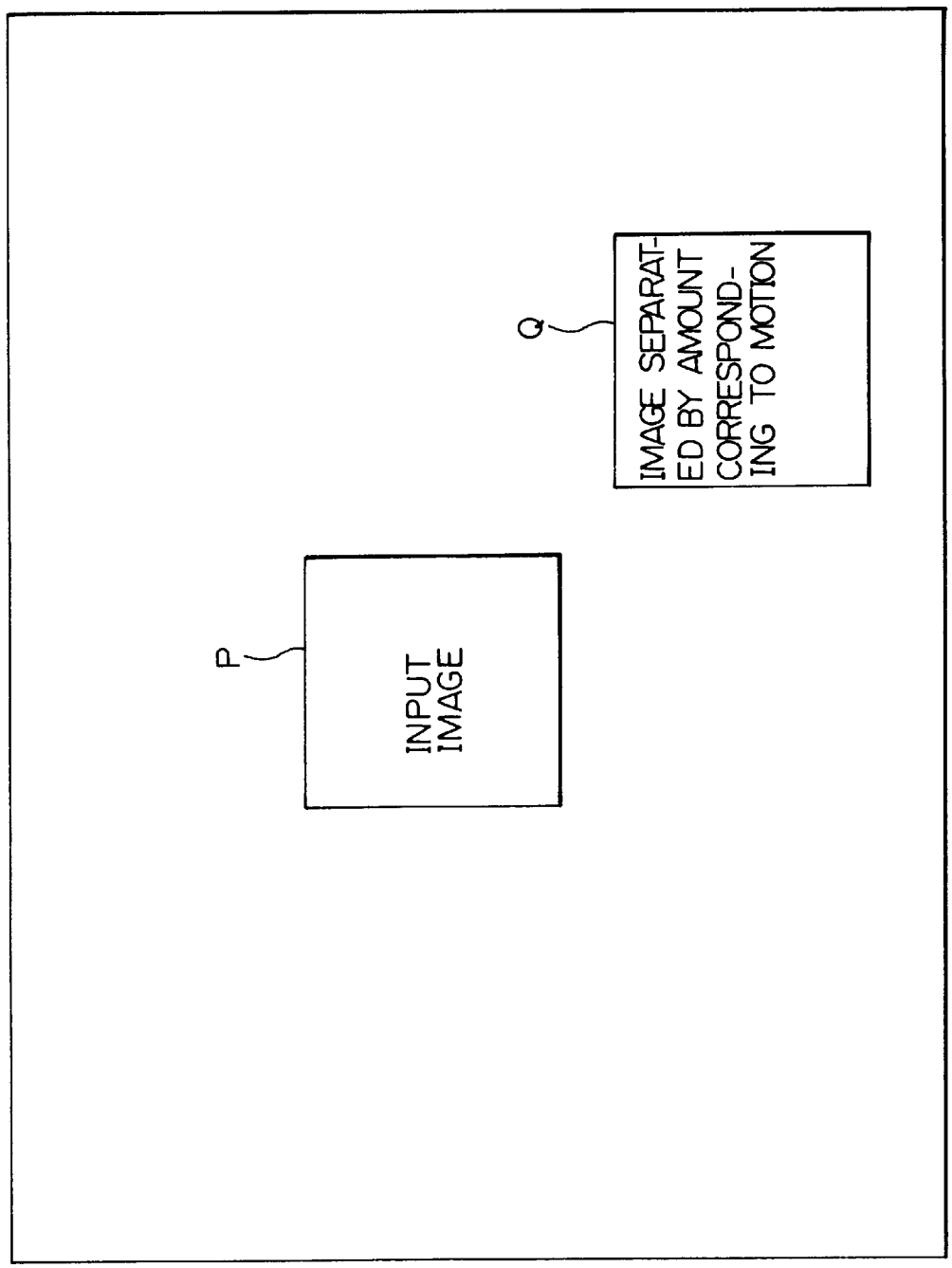

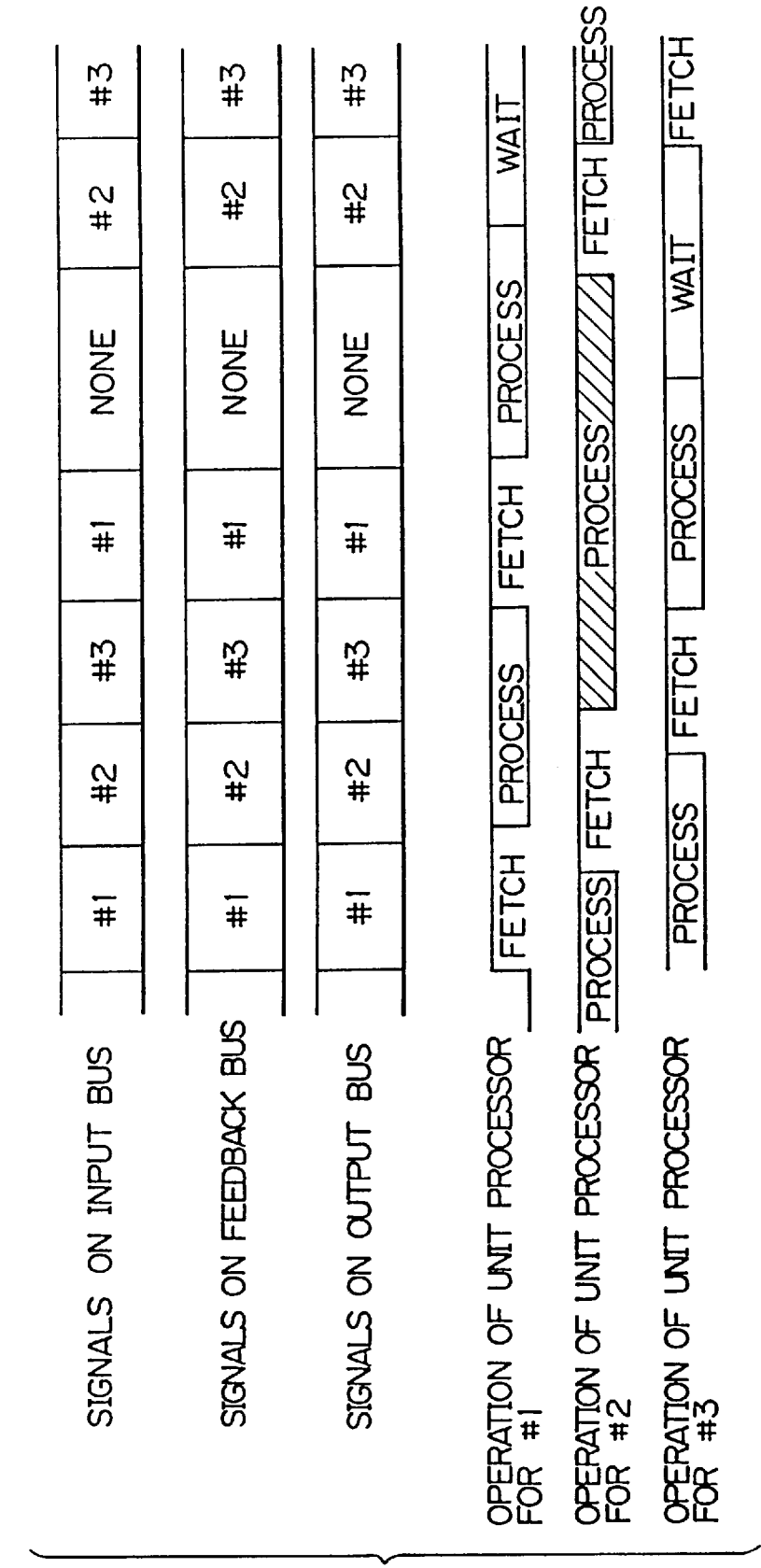

MULTIPROCESSOR SYSTEM WITH UNIT PROCESSORS ASSIGNED A PLURALITY OF NON-CONTIGUOUS REGIONS

This application is a continuation of application Ser. No. 07/521,827, filed May 10, 1990, now abandoned.

BACKGROUND OF THE INVENTION

The present invention relates to a multiprocessor type time varying image encoding system which executes encoding in units of blocks by assigning processing tasks substantially equally to digital signal processor modules (hereinafter referred to as "DMM's") each comprising a plurality of digital signal processors (hereinafter referred to as "DSP's"). The present invention also relates to a data bus control method which employs DSP's, and to an image processor which subjects an input signal, for example, a television signal, to a high efficiency encoding processing.

Referring to FIG. 17, which is a block diagram showing the arrangement of a conventional multiprocessor type time varying image encoding system disclosed, for example, in PCS 88P15.2 "ARCHITECTURE OF A FULL MOTION 64KBIT/S VIDEO CODEC", a CPU 171 controls the system, and a frame store/common memory 172 stores input data 1000. DSP's (Digital Signal Processors) 173a to 173h execute encoding according to an encoding program, and local memories 174a to 174h store data. A VME bus 175 connects together the CPU 171 and the DSP's 173a to 173h. A memory bus 176 connects together the frame store/common memory 172 and the local memories 174a to 174h. Reference numeral 1001 denotes transmission data.

In this system, the DSP's are arranged in parallel to execute processing for respective regions of an input image which are fixedly assigned thereto.

In the arrangement shown in FIG. 17, six of the eight DSP'S 173a to 173h are in charge of processing a luminance signal. An input image is equally divided into six regions along vertical lines, and these regions are assigned to the six DSP's. The remaining two DSP's are in charge of processing two different kinds of color difference signal. Thus, each DSP executes encoding processing for the region assigned thereto.

In general, time varying image encoding involves feedback control in which a picture frame is divided into L (any integer, assumed to be 18 in this example) regions, and an encoding control parameter (TCR) for the (i+1)-th region is set on the basis of the amount of information generated up to the i-th region, which has already been subjected to the encoding process. FIG. 18(a) shows one example of the division of a picture frame among DSP's and the way of frame division for feedback control. In the example shown in FIG. 18(a), a picture frame is divided into three regions for three DSP's to effect feedback control, thereby encoding only the luminance signal, for simplification of the explanation. More specifically, the picture frame is divided into three regions A, B and C for the three DSP's, and the regions are each subdivided into three regions, i.e., A1 to A3, B1 to B3 and C1 to C3.

Referring back to FIG. 17, the input data 1000 is written into the frame store/common memory 172 for only one frame at a time.

The CPU 171 instructs the eight DSP's 173a to 173h to transfer data sequentially. In response to the instructions, the DSP's 173a to 173h transfer the input data for the regions assigned thereto, together with the feedback data, already coded, concerning the regions required to execute encoding for the regions assigned thereto, from the frame store/common memory 172 to the respective local memories 174a to 174h through the memory bus 176.

After completion of the transfer process, each of the DSP's 173a to 173h divides its first assigned region into blocks as being units of processing and sequentially executes a plurality of different kinds of processing task for each block according to a predetermined order. Then, the DSP's 173a to 173h transfer the coded data to the CPU 171 through the VME bus 175. In addition, the DSP's 173a to 173h locally decoded the coded data to prepare feedback data and transfer it to the frame store/common memory 172 through the memory bus 176.

After completion of the processing for the first assigned regions, the DSP's 173a to 173h stand by until the CPU 171 instructs them to start processing for the subsequent regions.

The CPU 171 receives the coded data-from the DSP's 173a to 173h through the VME bus 175, reconstructs the data in the sequence determined according to the transmission format, adds multiplex information to the reconstructed data to prepare transmission data 1001 and sends it to the transmission line. The CPU 171 further monitors the DSP's 173a to 173h as to whether or not they have completed the processing for the assigned regions. When detecting that all the DSP's 173a to 173h have completed the processing for the assigned regions, the CPU 171 instructs the DSP's 173a to 173h to start processing for the subsequent regions.

The conventional multiprocessor type time varying image encoding system, arranged as described above, suffers, however, from the following problems. When the amount of arithmetic operation required for a processing varies with spatial and temporal changes as in the time varying image encoding process [see FIG. 18(b)], a DSP which has completed the processing for the assigned region must wait until the other DSP's complete the processing for the assigned regions. Consequently, the processing efficiency per unit DSP is low. Accordingly, the number of DSP's arranged in parallel must be set by taking into consideration the maximum processing quantity for the assigned regions, and therefore the number of DSP's required becomes extremely large. As the number of DSP's arranged in parallel increases, the overhead increases. In a case where the processing block size differs depending on the kind of task, the data to be processed cannot be divided into blocks which are smaller than the largest block size and the number of DSP's which can be employed is limited. When the number of DSP's arranged in parallel is small, the capacity of each local memory must be large and it is difficult to effect feedback control.

In the conventional multiprocessor type time varying image encoding system, the input data and the feedback data are transferred from the frame store/common memory 172 to the local memories 174a to 174h through a single memory bus 176. However, an image encoding process needs to transfer a large amount of data, for example, about 1,400 words for effecting motion compensation and discrete cosine transform encoding in which a block consisting of 16×16 picture elements is defined as one processing unit. Although there is no problem when image data at predetermined positions are sequentially transferred to the local memories of the processors as in the case of the prior art, if adaptive block assignment wherein each DMM is adaptively assigned to a block at random is adopted, the transmission speed of the bus system functions as a bottle neck and this invites a lowering in the processing efficiency.

FIG. 17 also shows a conventional data bus control method that employs a plurality of DSP's.

In the figure, a VME bus 5 is connected to a CPU 171 on the one hand and to a frame store/common memory 172 and DSP's 173a to 173h on the other. The DSP's 173a to 173h are provided with local memories 174a to 174h, respectively. The local memories 174a to 174h and the frame store/common memory 172 are connected to each other through a memory bus 176. Input data 1000 is inputted to the frame store/common memory 172, and transmission data 1001 is inputted to and outputted from the CPU 171.

Even in the case of parallel processing wherein the DSP's 173a to 173h execute processing for respective regions of an input image which are fixedly assigned thereto as in the illustrated example, bus contention occurs when the DSP's 173a to 173h transfer the input data from the frame store/common memory 172 to the respective local memories 174a to 174h at the time of starting processing for the assigned regions, or when the DSP's 173a to 173h transfer the feedback data from the local memories 174a to 174h to the frame store/common memory 172 after completion of the processing for the assigned regions. When bus contention occurs, the DSP's 173a to 173h stand by until they receive a common memory access instruction.

In task distributing parallel processing in which regions and tasks are variably assigned to the parallel-arranged DSP's 173a to 173h as occasion demands, if a common memory access request is outputted each time a task is completed, bus contention occurs even more frequently as the number of parallel DSP's employed increases, resulting in a lowering in the processing efficiency of the DSP's 173a to 173h.

In the conventional bus control method described above, a common memory access request is outputted when it becomes necessary to access the common memory. Accordingly, when two or more processors output a common memory access request at the same time, bus contention occurs. In such a case, a processor which is not permitted to use the common memory can perform no operation until it obtains permission to use the common memory, which invites a lowering in the processing efficiency due to the bus transmission speed bottle neck. Thus, the conventional bus control method has problems to be solved.

FIG. 19 is a block diagram of a conventional image processor disclosed, for example, in Japanese Patent Public Disclosure No. 62-86464. This image processor is arranged such that one picture frame is divided into a plurality of sectional frames #1 to #3, as exemplarily shown in FIG. 20, and unit processors (i.e., unit signal processors) are assigned to the sectional frames #1 to #3, respectively, thereby parallel-processing image signals by a plurality of unit processors, and thus achieving high efficiency encoding of time varying image signal (e.g., television signals). In FIG. 19, reference numeral 191 denotes an input bus for a image signal, e.g., a television signal, 192 a feedback bus for coded/decoded partial frame signals, 193 an output bus for outputting the result of encoding, and 194a to 194c unit processors which are assigned the sectional frames #1 to #3, respectively. Each of the unit processors 194a to 194c has a fetching unit 195, a processing unit 196 and an output unit 197. The fetching unit 195 fetches and stores an input image signal (partial frame signal) for the assigned sectional frame region from the input bus 191 and a coded/decoded signal (described later) for neighbor processing from the feedback bus 192, in synchronism with a fetching instruction for the assigned sectional frame region. It should be noted that, as an example of the neighbor processing, a technique disclosed in Japanese Patent Public Disclosure No. 62-266678 is known. The processing unit 196 subjects the stored image data to a processing such as an encoding/decoding processing. The output unit 197 sends to the output bus 193 a coded signal as the result of the processing executed in the processing unit 196 and also sends the above-described coded/decoded signal to the other unit processors through the feedback bus 192, as being an input image auxiliary signal, in synchronism with a subsequent fetching signal.

FIGS. 21 and 23 show the relationship between the signal fetching time and the signal processing time in each of the unit processors 194a to 194c with regard to the signals on the buses. In the figures, the unit processors which are in charge of the sectional frames #1 to #3 are represented by #1 to #3, respectively, for simplification of the explanation.

Input partial frame signals S1 to S3 as being television signals corresponding to the sectional frames A to C flow on the input bus 191 temporally sequentially, as shown in FIG. 21. The unit processor 194a, for example, fetches the input partial frame signal S1 for #1 from the input bus 191 and stores it into the fetching unit 195 in synchronism with a fetching operation timing such as that shown in FIG. 21. The input partial frame signals S1 to S3 are inputted at a constant speed, i.e., F (natural number) frames per second. Accordingly, the processing of the fetched input partial frame signals S1 to S3 must be completed before subsequent input partial frame signals S1 to S3 are fetched.

The coded signals that are obtained as the result of the processing are outputted to the output bus 193 at the same time as the subsequent fetching operation. In the motion compensating interframe encoding method that is often adopted as a high efficiency image encoding technique, encoding is effected by determining the difference between an input image P and an image Q in the decoded frame which immediately precedes the present frame, the image P being separated from the image Q on the frame by an amount corresponding to the motion, as shown in FIG. 22. Accordingly, the encoding processing necessitates a coded/decoded frame the area of which is enlarged by an amount corresponding to the motion. For such an encoding processing, data for a wider area than the area covered by each of the input partial frame signals S1 to S3 is needed. Further, the coded/decoded partial frame signals F1 to F3 are outputted to the feedback bus 192 from the output units 197 and fetched into the fetching units 195 in synchronism with the fetching timing shown in FIG. 21. At this time, the fetching time lengthens by the time t required to fetch data for the excess of the area covered by each of the input partial frame signals S1 to S3. Thus, the encoding processing is executed by fetching the coded/decoded partial frame signals F1 to F3 for wider areas than the assigned sectional frames, and the resulting signals O1 to O3 are outputted to the output bus 193.

In the conventional image processor having the above-described arrangement, a kind of pipeline processing is executed on the assumption that the processing time of the unit processors 194a to 194c falls within a predetermined time 1/F. Accordingly, in an image processing such as high efficiency encoding, the processing time varies depending upon the kind of input image, and the number by which the picture frame is divided must be set on the basis of the longest processing time, as described above. Even if the average processing time is much shorter than the longest processing time, the number by which the picture frame is divided cannot be reduced and, after all, a large number of unit processors must be prepared.

In the arrangement shown in FIG. 21, the sum total of the time required for the unit processors 194a to 194c to fetch partial image signals and the time required to execute processing, for example, encoding/decoding processing, for the partial image signals is not greater than the period of inputting one picture frame from the input bus 191. Accordingly, the above-described processing can be continued without delay. However, in such a case that a part of one picture frame, for example, the region #2 has more motion than the other frame regions, the processing time in the unit processor 194*b*, which is in charge of the region #2, becomes longer than the processing time in the other unit processors 194*a* and 194*c*, as shown by the hatching in FIG. 23, and the unit processors 194*a* and 194*c* undesirably have a waiting time.

Thus, since in the prior art the sectional frames assigned to the unit processors 194*a* to 194*c* are contiguous with each other, if the processing in one unit processor takes a relatively long time because a picture frame has a partiality in the nature (i.e., a large difference in the amount of data to be processed), the other unit processors are adversely affected, resulting in a lowering in the processing capacity, even if the image processor has an overall capacity sufficient to process the input image signal within a predetermined period of time. This problem may be solved by narrowing the sectional frame assigned to each unit processor and increasing the number by which one picture frame is divided. Such a solution, however, gives rise to another problem, that is, a rise in the cost of the image processor because of an increase in the number of unit processors used.

SUMMARY OF THE INVENTION

In view of the above-described problems of the prior art, it is a first object of the present invention to provide a multiprocessor type time varying image encoding system which is capable of making the best use of the processing capacity of the parallel arrangement of multiprocessors.

To attain the first object, the present invention provides a multiprocessor type time varying image encoding system which comprises: a plurality of DMM's disposed in parallel; a plurality of common memories connected to the DMM's to store locally decoded data or data which is being encoded and parameters; an input frame memory constituted of a plurality of buffers, one side of which is opened up for a circuit for writing input data, and the other side of which is opened up for the DMM's, so that writing and reading operations can be executed asynchronously; a task control unit instructing each of the DMM's about the position of a processing block assigned thereto and the contents of a processing task to be executed through a control bus; and a task table for storing information required for the task control unit to control the DMM'S. With this arrangement, a plurality of DMM's are assigned tasks having substantially equal amounts of information to be processed, thereby increasing the processing efficiency per unit DMM.

In the multiprocessor type time varying image encoding system according to the present invention, the task control unit divides a picture frame into a plurality of blocks, retrieves the task table to determine an optimal block to be processed and processing task to be executed for each DMM and assigns a plurality of DMM's processing tasks substantially equally to execute encoding, thereby shortening the waiting time, and thus achieving an efficient processing operation.

It is a second object of the present invention to provide a multiprocessor type time varying image encoding system which is unlikely to suffer a lowering in the processing efficiency due to the bus transmission speed bottle neck even when adaptive block assignment is adopted.

To attain the second object, the present invention provides a multiprocessor type time varying image encoding system wherein a plurality of common memories are connected to DMM's through respective memory buses which are spatially separated from each other, and a task control unit executes bus arbitration for all the memory buses in response to a bus request from each DMM.

Since the memory buses in the above-described arrangement are independently provided for the common memories, a plurality of DMM's can simultaneously access data at desired locations in different memories. Accordingly, even when adaptive block assignment is adopted, the bus transmission speed bottle neck is unlikely to occur and there is therefore substantially no danger of a lowering in processing efficiency due to the bus transmission speed bottle neck.

It is a third object of the present invention to provide a bus control method which has no danger of a lowering in the processing efficiency even if bus contention occurs.

To attain the third object, the present invention provides a bus control method wherein, when a processor needs to fetch data from a common memory or transfer data to it when entering a subsequent processing upon completion of the previous processing, the processor outputs a bus use request at a predetermined time before the completion of the previous processing.

According to the bus control method of the present invention, a processor outputs a bus use request at a predetermined time before the completion of the previous processing at any time it needs to use a bus. Accordingly, even if bus contention occurs, the processor will not enter a waiting state but will execute the rest of the previous processing. There will therefore be no danger of a lowering in the processing efficiency of the processors.

It is a fourth object of the present invention to provide an inexpensive image processor which is designed so that the number by which a picture frame is divided is determined on the basis of an average processing time, and if the processing time in a particular processing is longer than the average, the input speed of input partial frame signals is forcibly lowered, thereby enabling a reduction in the number of unit processors used.

To attain the fourth object, the present invention provides an image processor having a plurality of unit processors each including a fetching unit for fetching input partial frame signals inputted to an input bus on a frame-by-frame basis, a processing unit for executing an encoding/decoding processing on the input partial frame signal fetched in the fetching unit, and an output unit for outputting the result of the encoding/decoding processing in the processing unit, wherein the improvement comprises a storage unit for storing coded/decoded partial frame signals obtained as the result of the encoding/decoding processing, a control unit for controlling the fetching, processing, storage and output operations in each of the unit processors, and a common storage unit for storing, when the coded/decoded partial frame signals are stored into the storage unit, a coded/decoded partial frame signal which is required to process a subsequent frame, the common storage unit being accessible from the relevant unit processor and at least one of the other unit processors.

In the image processor according to the present invention, one picture frame is divided into a plurality of sectional frames, which are processed by unit processors for their exclusive use. Each unit processor stores the coded/decoded partial frame signals in the storage unit provided therein and, at the same time, stores a coded/decoded partial frame signal which needs to be referred to from other unit processors into the common storage unit which can also be accessed by the other unit processors, thereby enabling another unit processor to use the coded/decoded partial frame signal written in the common storage unit during an encoding processing. Thus, the number by which one picture frame is divided into sectional frames is determined on the basis of an average processing time, and when the processing time of a particular processing is longer than the average, the input speed of input partial frame signals is lowered, thereby enabling a reduction in the number of unit processors used.

It is a fifth object of the present invention to provide an image processor which is designed so that it is possible to prevent a lowering in the processing capacity due to a partiality in the nature of an image without the need to increase the number of unit processors used.

To attain the fifth object, the present invention provides an image processor having a plurality of unit processors which are respectively assigned specific frame regions of one picture frame to fetch input partial image signals corresponding to the specific frame regions, execute a signal processing on them and send the processed signals to an output bus, each unit processor being capable of fetching a signal processed by another unit processor, as being an input image auxiliary signal for neighbor processing, wherein each of the unit processors is assigned a plurality of frame regions which are not contiguous but separated from each other, and all the unit processors simultaneously start processing of input partial image signals and input image auxiliary signals after fetching the input partial image signals corresponding to the assigned frame regions, and wherein each unit processor has a storage unit for storing a signal processed therein, and the processed signal stored in the storage unit is read out to a common bus by a transfer control unit after completion of the signal processing operations in all the unit processors in such a manner that the readout signal can be fetched by another unit processor.

In an image processor having the above-described arrangement, each unit processor is in charge of processing image signals for a plurality of sectional frames which are not contiguous but separated from each other, and all the unit processors simultaneously begin processing in synchronism with the start of a new picture frame. In addition, the delivery of the coded signals to the output bus and the transfer of an input image auxiliary signal to another unit processor are executed after the completion of the signal processing operations in all the unit processors. Accordingly, even when the processing time for the partial image signal corresponding to one sectional frame is relatively long, if the processing time for the partial image signals corresponding to the other sectional frames is relatively short, the processing time periods for the partial frames of one frame average out, so that it is possible to complete the signal processing within the period of inputting image signals for one frame. Even if the processing time exceeds the input period, the excess processing time can be absorbed in the processing for the next frame on the same principle and the averaging of the processing time periods is therefore effected between a pair of adjacent frames.

BRIEF DESCRIPTION OF THE DRAWINGS

FIG. 1 is a block diagram showing the single-DMM module arrangement of one embodiment of the multiprocessor type time varying image encoding system according to the present invention;

FIG. 2 is a block diagram showing the arrangement of a digital signal processor module (DMM);

FIG. 4 is a block diagram showing the multiple DMM module arrangement of one embodiment of the multiprocessor type time varying image encoding system according to the present invention;

FIG. 5 is a timing chart exemplarily showing the timing at which each DMM in one embodiment of the multiprocessor type time varying image encoding system according to the present invention accesses memory buses;

FIG. 6 is a block diagram of a multiprocessor type time varying image encoding system that adopts one embodiment of the bus control method according to the present invention;

FIG. 7 shows one example of the task processing operation according to one embodiment of the present invention;

FIG. 8 is a block diagram of one embodiment of the image processor according to the present invention;

FIG. 11 shows sectional frames which are respectively assigned to the unit processors employed in the embodiment shown in FIG. 10;

FIGS. 14 and 15 show the contents of storage units in the embodiment shown in FIG. 10;

FIG. 17 is a block diagram showing the arrangement of a conventional multiprocessor type time varying image encoding system;

FIG. 21 is a timing chart showing signals at various portions in the block diagram shown in FIG. 19;

FIG. 22 shows an operation in the motion compensating interframe encoding method; and FIG. 23 is a timing chart showing the operation of the prior art.

DETAILED DESCRIPTION OF THE PREFERRED EMBODIMENTS

Figure 3A:
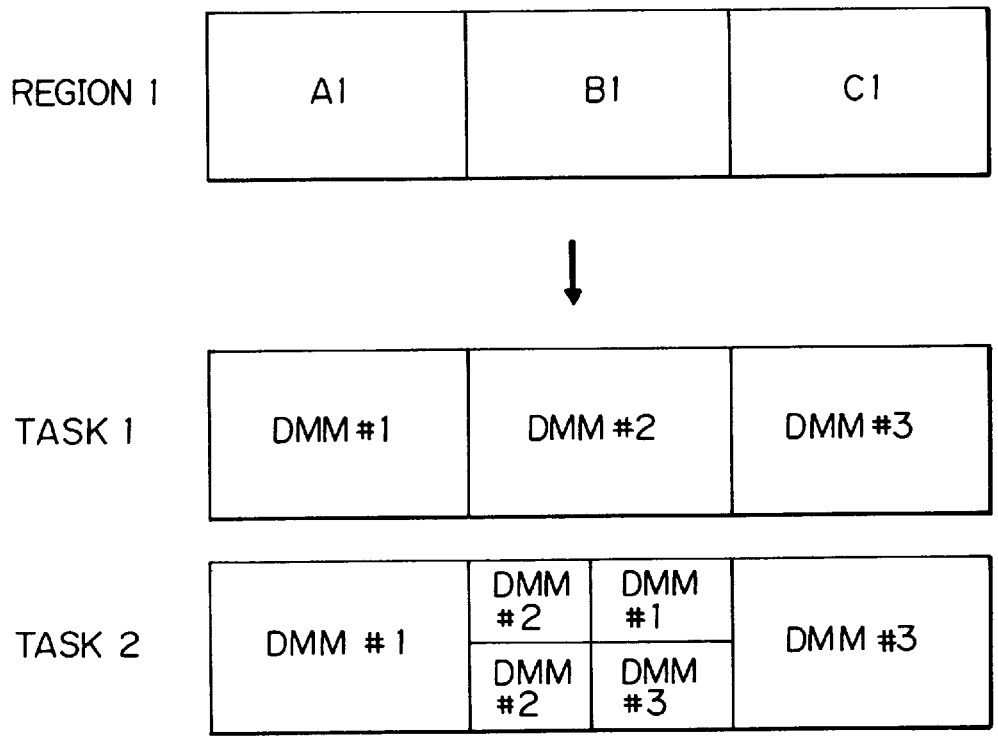
FIG. 3 shows the operation of each DMM in one embodiment of the multiprocessor type time varying image encoding system according to the present invention.

One embodiment of the present invention will be described below with reference to the accompanying drawings.

Referring to FIG. 1, which is a block diagram showing the arrangement of one embodiment of the multiprocessor type time varying image encoding system according to the present invention, reference numeral 7 denotes a task control unit which instructs each DMM by commands about the position of a processing block assigned thereto and the contents of a processing task to be executed, and reference numeral 8 denotes a task table for storing information required for the task control unit 7 to control the DMM's.

A memory bus control table 24 stores information required for the task control unit 7 to arbitrate between memory buses 14a to 14n.

An input frame memory 9 comprises a plurality of buffers. One side of the input frame memory 9 is opened up for a circuit which writes input data, and the other side is opened up for the DMM's, so that writing and reading operations can be executed asynchronously. Common memories 10a to 10n are connected to the DMM's to store locally decoded data or data which is being encoded and parameters.

Digital signal processor (DSP) modules (DMM's) 11a to 11k each comprise a DSP and its peripheral circuits. A control bus 12 connects together the task control unit 7 and the DMM's 11a to 11k. A memory bus 13 connects together the input frame memory 9 and the DMM's 11a to 11k, and memory buses 14a to 14n connect together the common memories 10a to 10n and the DMM's 11a to 11k.

Reference numerals 15 and 16 denote an I/O bus and a DMM module, respectively.

Referring next to FIG. 2, which is a block diagram showing the arrangement of one DMM, an instruction memory 17 stores an encoding program, and an interrupt control unit 18 delivers an interrupt signal 1002 to a DSP 3 while arbitrating between interrupt signals sent from the control bus 12. The interrupt control unit 18 also receives address and data from a local bus 19, decodes it to generate an interrupt signal and sends it to the control bus 12.

A command port 20 delivers command data between the control bus 12 and the DSP 3. Two-way buffers 21a to 21n+2 are controlled by instructions from the DSP 3 as to whether or not they are enabled to output data and whether data is to be outputted in one direction or the other.

Further, a local RAM 22 is connected to the local bus 18 leading to the DSP 3. A local ROM 23 is stored with encoding parameters used in the encoding processing executed in the DSP 3.

The operation of this embodiment will next be explained with reference to FIGS. 1 and 2.

Input data 1000 is written on one side of the input frame memory 9 on a frame-by-frame basis, and the input data which has already been written is read out from the other side of the input frame memory 9 on a frame-by-frame basis.

The task control unit 7 is informed of the completion of an input frame memory writing operation from a frame synchronizing pulse 1003 delivered from the input frame memory 9, arbitrates between the input data reading operation and the encoding processing by referring to the task table 8, and inhibits switching of the buffers in the input frame memory 9 if necessary.

In encoding, the task control unit 7 retrieves the task table 8 to determine an optimal processing block and processing task for each of the DMM's 11a to 11k and informs each DMM of the determined processing block and task as being commands through the control bus 12. Each of the DMM's 11a to 11k decodes the command and executes the designated processing.

Every time the designated processing is completed, each of the DMM's 11a to 11l k informs the task control unit 7 of the completion of the task and stands by until it receives the next instruction.

It should be noted that examples of processing tasks include those of relatively small processing units, such as the transfer of data from the common memories 10a to 10n and DCT computation of a block consisting of 8×8 picture elements, combinations of these processing tasks, and processing tasks for blocks with an enlarged size.

In the case of a combined task, when the DMM's 11a to 11k need to access the common memories 10a to 10n during a processing operation, the DMM's 11a to 11k output a common memory access request to the task control unit 7 and stand by until they are permitted to access the common memories 10a to 10n.

Meantime, the DSP 3 is first in a stand-by state. The task control unit 7 determines a task which is to be assigned to the DSP 3, writes the position of a processing block, processing block size, processing contents, attributes of the block, etc. into the command port 20, and kicks the interrupt control unit 18 into operation.

Then, the interrupt control unit 18 outputs an interrupt signal 1002 to the DSP 3. The DSP 3 reads the command port 20, decodes the commands and executes the assigned processing according to the designated task. During the processing, the DSP 3 opens the two-way buffers 21a to 21n to access the common memories 10a to 10n or accesses the local RAM 22 or the local ROM 23, if necessary.

Upon completion of the processing, the DSP 3 writes data which is to be transferred to the task control unit 7 and then outputs a predetermined address to enter a stand-by state.

The interrupt control unit 18 decodes the address 1004 to generate an interrupt signal and sends it to the control bus 12.

Figure 3B:
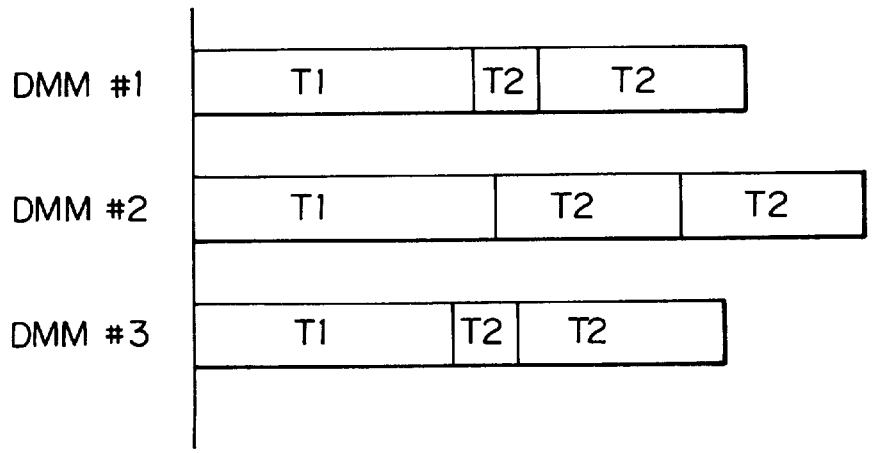

Assuming that the number of DMM's used is three and an assigned task processing includes two different kinds of encoding processing, for simplification of the explanation, as shown in FIG. 3, the task control unit 7 assigns DMM's #1 to #3 three regions A, B and C, respectively, and instructs them to process a task 1. The task control unit 7 then judges from the results of the task 1 that the processing of a task 2 for the region B needs a relatively large amount of computation, and subdivides the region B to assign all the three DMM's the task 2 for the region B, thereby reducing the waiting time of DMM's which have already completed the processing operations assigned thereto, and thus increasing the processing efficiency.

Although in the above-described embodiment the task control unit 7 is independently provided, it should be noted that the present invention is not necessarily limitative to the described arrangement and that one of the DMM's may be additionally provided with a task control function to thereby omit the task control unit 7.

Depending upon the scale of the system and the specifications, no task division may be needed, and advantageous effects of the present invention may be obtained simply by effecting the control such that a given region is divided into small blocks and DMM's which have already completed the assigned processing operations are successively assigned new blocks.

Although in the foregoing embodiment the present invention is described by way of the single-DMM module 16 of a multiprocessor type time varying image encoding system, it should be noted that the present invention is not necessarily limitated thereto and that a plurality of DMM modules 16 may be connected in series to effect a pipeline processing, as shown in FIG. 4. In FIG. 4, reference numerals 25a, 25b . . . denote ports each connecting together a pair of adjacent task control units 7, and 26a, 26b . . . denote two-port memories each connected between the I/O buses 15 of a pair of adjacent DMM modules.

Thus, according to the present invention, a plurality of DMM's each comprising a DSP and its peripheral circuits are disposed in parallel, a picture frame is divided into a plurality of blocks, an optimal processing block and processing task are determined for each DMM by retrieving a task table, and the DMM's are assigned processing tasks substantially equally to effect an encoding processing. It is therefore possible to reduce the waiting time of DSP's and hence increase the processing efficiency per unit DSP. Thus, it is possible to construct a system capable of processing a large amount of computation with a relatively small number of DSP's.

The bus control operation will next be explained. Referring to FIG. 1, the input data 1000 is written into the input frame memory 9 by an external circuit on a frame-by-frame basis. Upon completion of the writing of the input data 1000 for one frame, a write completion signal 1003 is outputted to the task control unit 7. Upon the condition that the encoding processing for the previous frame is completed and the writing of the input data 1000 is also completed, the task control unit 7 divides a subsequent frame into processing blocks, determines an optimal processing block and processing task for each of the DMM's 11*a* to 11*k* by retrieving the task table 8 and informs each DMM about the determined processing block and task in the form of commands via the control bus 12. The DMM's 11*a* to 11*k* decode the commands and execute the processings assigned thereto. Upon completion of the processings, each of the DMM's 11*a* to 11*k* informs the task control unit 7 of the completion of the assigned processing and enters a stand-by state. By repeating this operation, the time varying image encoding processing is successively executed. During the encoding processing, if any of the DMM'S 11*a* to 11*k* needs to access the input frame memory 9 or the common memories 10*a* to 10*n*, the DMM outputs a common memory access request to the task control unit 7. The task control unit 7 retrieves the memory bus control table 24 to judge the state of use of the memory buses 13 and 14*a* to 14*n*. If these memory buses are idle, the task control unit 7 immediately outputs a use permit signal to the one of the DMM's 11*a* to 11*k* that needs to access the common memories 10*a* to 10*n*, whereas, if the memory buses 13, 14*a* to 14*n* are in use, the task control unit 7 outputs a use permit signal after they become idle. When access requests to the same common memory are outputted from two or more DMM's while the memory buses 13 and 14*a* to 14*n* are in use, the task control unit 7 determines an order of priority and grants bus use permission to the DMM's in the order of priority.

FIG. 5 is a timing chart showing the way in which memory buses are used in a system which has three common memories and three DMM's, for example. In the figure, each memory bus is independently accessed by each DMM in a time-division manner. Thus, there is substantially no waiting time due to the bus contention of the DMM's.

Although in the foregoing embodiment the task control unit arbitrates between the memory buses, a bus control unit which arbitrates between the memory buses by retrieving the memory bus control table is provided independently of the task control unit. The number of DMM's used may be selected to be two or more, as desired.

Thus, according to the present invention, a plurality of common memories are independently provided with memory buses so that a plurality of DMM's can simultaneously access any desired locations in different common memories through the arbitration of the task control unit. It is therefore possible to obtain a system in which the bus transmission speed bottle neck is unlikely to occur and any lowering in processing efficiency due to bus-neck is therefore minimized. In addition, since the task control unit performs bus arbitration, it is possible to determine an order of priority concerning the use of buses with the operating condition of each DMM being taken into consideration, and it is therefore possible to achieve effective bus control.

Another embodiment of the multiprocessor type time varying image encoding system according to the present invention will be explained below in detail with reference to FIGS. 6 and 7.

Referring first to FIG. 6, input data 67 from an external circuit is written into a common memory 62 on a frame-by-frame basis. Upon completion of the writing of the input data 67 for one frame, a write completion signal 70 is outputted to a task control unit 69.

A bus control unit 71 arbitrates between common memory access requests from DSP's 63*a* to 63*n* and grants common memory access permission to one of the DSP's. The DSP's 63*a* to 63*n* exchange common memory access request/permit signals 72*a* to 72*n* with the task control unit 69. Further, the DSP's 63*a* to 63*n* exchange input/output data signals 73*a* to 73*n* with the common memory 62 via a memory bus 66, and common memory access request/permit signals 75*a* t 75*n* with the bus control unit 71. The common memory 62 exchanges an input/output data/control signal 74 with the memory bus 66. Transmission data 68 is outputted from the memory bus 66.

The operation will next be explained. In this embodiment, the present invention is exemplarliy applied to a task distributing parallel processing in which regions and tasks are variably assigned to the DSP's 63*a* to 63*n* arranged in parallel.

Referring to FIG. 6, input data 67 is written into the common memory 62 from an external circuit on a frame-by-frame basis. Upon completion of the writing of the input data 67 for one frame, a write completion signal 70 is outputted to the task control unit 69. Upon the condition that the encoding processing for the previous frame is completed and the writing of the input data 67 for one frame is also completed, the task control unit 69 divides a subsequent frame into processing blocks and successively assigns them to the parallel DSP's 63*a* to 63*n*. The DSP's 63*a* to 63*n* sequentially process the assigned tasks according to predetermined programs written in their respective instruction memories, and when completing the assigned processing, each DSP informs the task control unit 69 of the completion of the processing. By repeating this operation, the time varying image encoding is successively executed. When any of the DSP's 63*a* to 63 needs to access the common memory 62, it outputs a common memory access request to the bus control unit 71 before the completion of the processing presently executed thereby. The bus control unit 71 judges whether or not the memory bus 66 is in use. If it is idle, the bus control unit 71 immediately outputs a use permit signal to the one of the DSP 63*a* to 63*n* that needs to access the common memory 62, whereas, if the memory bus 66 is in use, the bus control unit 71 outputs a use permit signal after it becomes idle. In this way, bus arbitration is effected.

The instruction memory of each of the DSP's 63*a* to 63*n* is alternately stored with a data transfer task for accessing the common memory 62 and an operation task for arithmetically processing data transferred to execute encoding so that a task for transferring data which has already been present in the common memory 62 or the internal memory of the DSP is executed a predetermined time before the completion of the preceding operation task.

FIG. 7 exemplarily shows the operations of three DSP's 63a, 63b and 63c in the arrangement shown in FIG. 6 when bus contention occurs between these three DSP's. In the figure, the axis of abscissas represents time. Referring to FIG. 7, the DSP 63a executes a data transfer task a predetermined time ($t_6$–$t_4$) before the completion of a task 1 and thereafter executes the rest of the task 1. At the time $t_6$ when the task 1 is completed, the DSP 63a starts execution of a task 2 by use of the data transferred during the period from $t_1$ to $t_4$. The DSP 63b outputs a transfer request at $t_2$, but the request is refused because of bus contention, and the DSP 63b therefore continues execution of the task 1. When receiving bus use permission at $t_4$, the DSP 63b executes data transfer from $t_4$ to $t_6$ and executes the rest of the task 1 from $t_6$ at which the data transfer is completed. The DSP 63c outputs a transfer request at $t_3$, but the request is refused because of bus contention, and the DSP 63c therefore continues execution of the task 1. The DSP 63c completes the task 1 at $t_5$ and then stands by until it receives bus use permission at $t_6$. From $t_6$, the DSP 63c executes data transfer.

Thus, in a bus control system wherein a plurality of DSP's 63 are connected to the common memory 62 which can be accessed by two or more DSP's 63 in a time-division manner, each DSP 63 outputs a common memory access request a predetermined time before the completion of the processing presently executed thereby, and the DSP's are granted common memory access permission in the order of priority. With the bus control method according to this embodiment, there is substantially no waiting state of the DSP's 63. Even if a waiting state occurs, it ends within an extremely short period of time, and the processing efficiency is therefore increased.

Although in the foregoing embodiment the present invention is exemplarily applied to a task distributing parallel processing, it should be noted that the described embodiment is not necessarily exclusive and that the present invention is effectively applied to any arrangement in which bus contention occurs when a plurality of DSP's 63 access the common memory 62, for example, in a parallel processing wherein sectional regions of a picture frame are fixedly assigned to DSP's, respectively, or in a pipeline processing wherein DSP's are connected in series with a two-port memory interposed between each pair of adjacent DSP's.

The number of DSP's used may be selected to be two or more, as desired.

Thus, according to the present invention, a common memory access request is outputted a predetermined time before it becomes actually necessary to access the common memory. Accordingly, even if bus contention occurs, no processor enters a waiting state, and it is therefore possible to achieve bus control in which the lowering in the processing efficiency due to bus contention is minimized.

Figure 20:
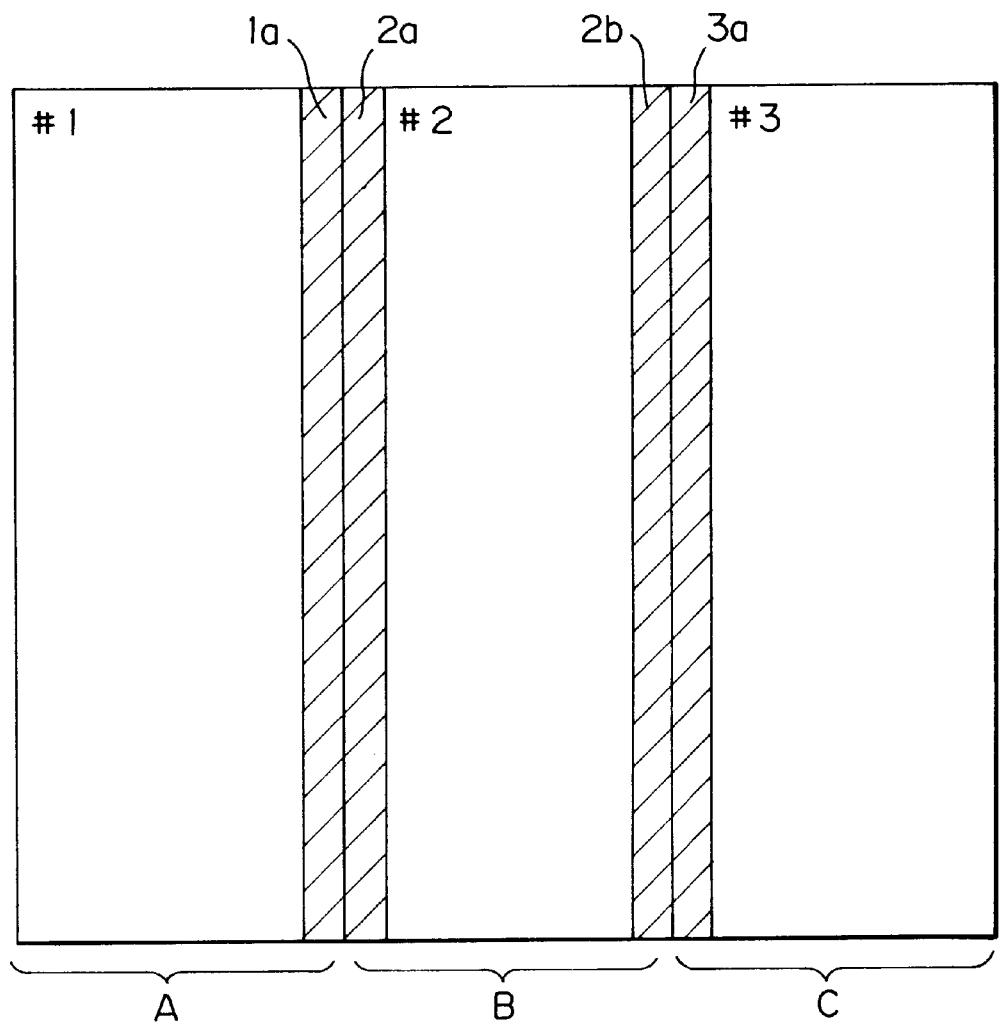
FIG. 20 shows one example of the division of a picture frame into a plurality of regions in the prior art and in the present invention.

Referring next to FIG. 8, reference numeral 86 denotes an input bus for input partial frame signals, 87 an output bus, and 80A, 80B and 80C unit processors. Each of the unit processors 80A, 80B and 80C is provided with a processing unit 81, a fetching unit 82 for fetching input partial frame signals, a common storage unit 83 for storing some of coded/decoded partial frame signals, a storage unit 84 for storing coded/decoded partial frame signals, and an output unit for outputting a coded partial frame signal as the result of the encoding processing. A control unit 88 controls a plurality of unit processors 80A to 80C. In this embodiment, as shown in FIG. 20, one picture frame is divided into sectional frames A, B and C, to which are assigned the unit processors 80A, 80B and 80C for their exclusive use to effect processing, in the same way as in the prior art.

Figure 9:
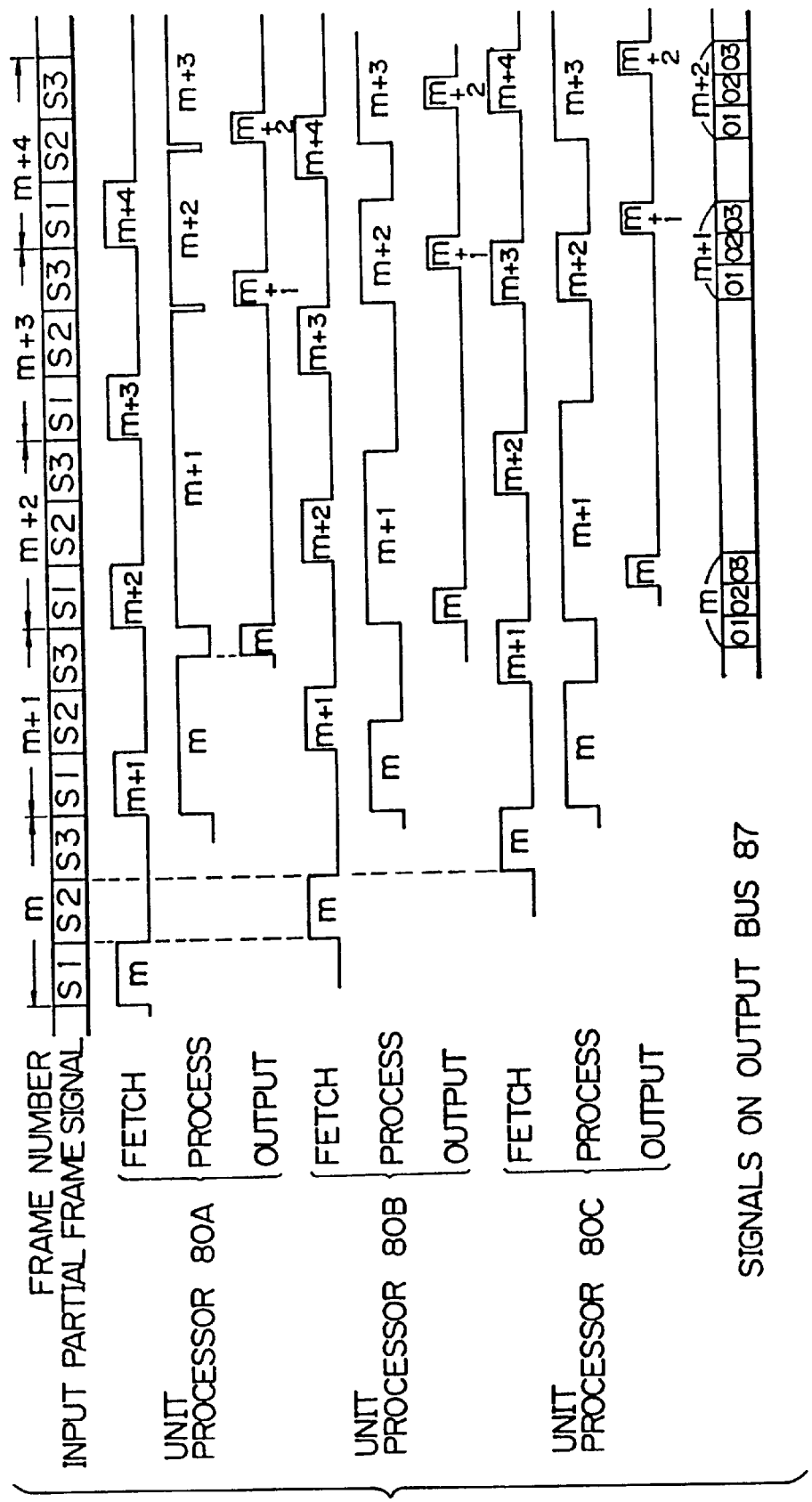
FIG. 9 is a timing chart showing signals at various portions in the block diagram of FIG. 8.

The input bus 86 is supplied with input partial frame signals S1 to S3 in a time-division manner, as shown in the timing chart of FIG. 9. The fetching unit 82 that fetches each of the input partial frame signals S1 to S3 has a double-buffer arrangement which enables writing and reading operations to be executed simultaneously. Since the input partial frame signals S1 to S3 are supplied to the input bus 86 without stagnation, one of the two buffers in each double-buffer unit is always connected to the write side so that all the input frames are always fetched. Assuming that input partial frame signals S1 to S3 for the frame m are inputted, the control unit 88 monitors the operations of the unit processors 80A to 80C, and when all the unit processors 80A to 80C complete the operation of inputting the frame m, the control unit 88 instructs all the unit processors 80A to 80C to start processing for the frame m. The time required for the unit processors 80A to 80C to complete processing depends on the input partial frame signals S1 to S3. In the illustrated example, the processing executed in the unit processor 80A for the frame m takes the longest time. Upon completion of the processings in all the unit processors 80A to 80C, the control unit 88 sequentially instructs the unit processors 80A to 80C to output the coded signals from the respective output units 85 to the output bus 87. At the same time, the control unit 88 monitors the state of the frame m+1 being inputted. Upon completion of the inputting of the frame m+1 into all the unit processors 80A to 80C, the control unit 88 instructs all the unit processors 80a to 80C to start processing for the frame m+1, thereby executing a processing operation similar to the above. In this example, the processings executed in the unit processors 80a and 80C for the frame m+1 are longer than the period of inputting the input partial frame signals S1 to S3. As a result, when all the unit processors 80A to 80C complete the processing operations, inputting of the frame m+2 into all the unit processors 80A to 80C has already been completed, and the processing for the frame m+2 is therefore started immediately.

The processing that is executed inside each of the unit processors 80A to 80C will next be explained with the unit processor 80A being taken as an example. Explanation will relate to the time at which the processing for the frame m begins. It is assumed that, at this time, the coded/decoded partial frame signal corresponding to the sectional frame A of the frame m−1 has already been stored in the storage unit 84 and the coded/decoded partial frame signal corresponding to the sub-region 2a (shown in FIG. 20), that is, the hatched portion of the sectional frame B adjacent to the sectional frame A, has also already been stored in the common storage unit 83. The control unit 88 fetches the input partial frame signals S1 to S3 from the fetching unit 82 in the form of a block to effect motion compensating interframe encoding using the coded/decoded partial frame signals for the immediately preceding frame stored in the storage unit 84 and the common storage unit 83 and outputs the resulting coded output to the output unit 85. At the same time, the control unit 88 stores the resulting coded/decoded partial frame signal into the storage unit 84. At this time, since the partial signal corresponding to the sub-region 1a shown in FIG. 20 is needed for the unit processor 80B to process the subsequent frame, it is stored into the common storage unit 83, which can also be accessed by the unit processor 80B, simultaneously with the storage of the coded/decoded partial frame signal.

By virtue of the above-described operation, one unit processor can use the result of the processing executed in another unit processor for the processing of the subsequent frame. Moreover, in the present invention, even when the processing time for a particular frame is longer than the period of inputting the input-partial frame signals S1 to S3 as in the case of the processing for the frame m+1 shown in FIG. 9, the excess processing time is absorbed by the processing time for the frames m and m+2 adjacent thereto, so that the processing time periods for these frames are leveled out. Accordingly, even in a use application in which the processing time may become longer than an average, the processing can be properly effected without the need to increase the number of unit processors used, by forcibly reducing the speed of inputting the input partial frame signals S1 to S3. Thus, it is possible to execute image processing at a reduced cost.

Although in the foregoing embodiment one common storage unit 83 is disposed between each pair of adjacent unit processors, i.e., between 80A and 80B, and between 80B and 80C, a single common storage unit 83 may be provided for three or more unit processors 80.

Thus, according to the present invention, when one unit processor stores a coded/decoded partial frame signal into a storage unit, a signal corresponding to a region of a picture frame which is needed for the processing executed by another unit processor is stored into a common storage unit which can also be accessed by the second unit processor. Accordingly, even in a case where the processing time may become longer than the period of inputting partial frame signals, the processing can be properly effected without the need to increase the number by which the picture frame is divided. Thus, it is possible to reduce the number by which the picture frame is divided in comparison to the prior art and hence possible to reduce the overall cost of the image processor.

Figure 10:
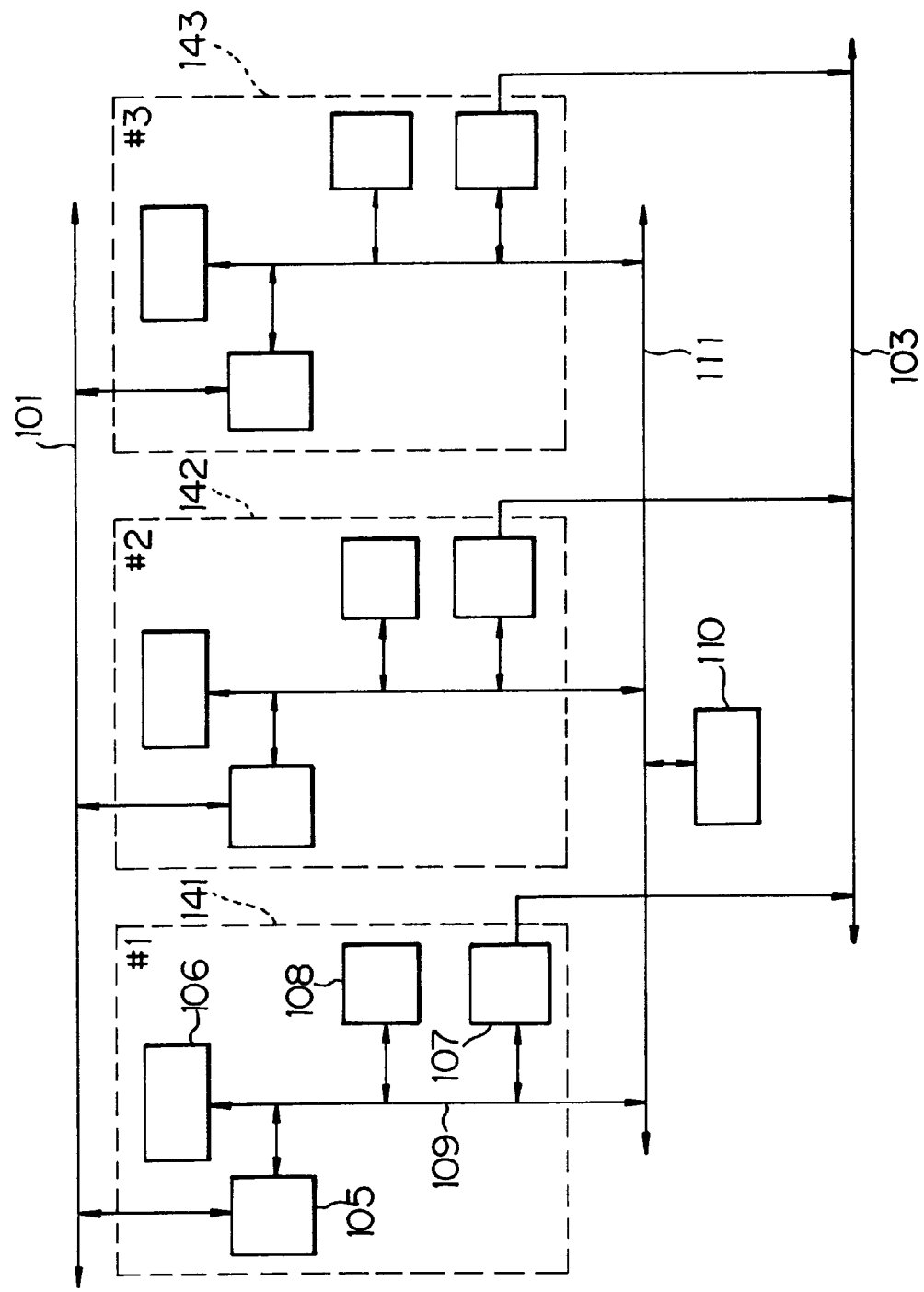
FIG. 10 is a block diagram of one embodiment of the image processor according to the present invention.

Referring next to FIG. 10, each of the unit processors #1 to #3 has a fetching unit 105, a processing unit 106, an output unit 107 and a storage unit 108, which are connected together through a local bus 109. The storage unit 108 has storage regions for respectively storing coded/decoded signals (data) of the partial frame signals corresponding to sectional frames Nos. 1 to 9 (described later).

Figure 11:
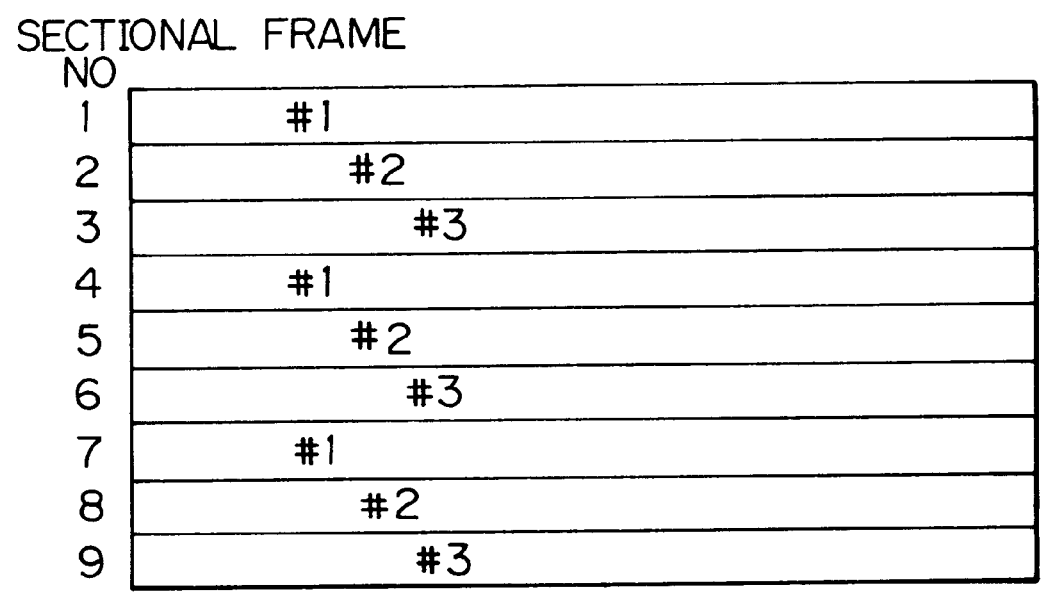

The unit processors #1 to #3 are in charge of the nine sectional frames Nos. 1 to 9 shown in FIG. 11. More specifically, one picture frame is divided into nine sections along horizontal lines. The unit processor #1 141 is assigned the sectional frames Nos. 1, 4 and 7, the unit processor #2 142 is assigned the sectional frames Nos. 2, 5 and 8, and the unit processors #3 143 is assigned the sectional frames Nos. 3, 6 and 9. In FIG. 10, reference numeral 110 denotes a transfer control unit, and 111 a common bus. It should be noted that the fetching unit 105 in each of the units processors #1 to #3 in this embodiment adopts an arrangement (e.g., a double-buffer arrangement) which enables reading and writing operations to be simultaneously executed because, while partial frame signals concerning the N-th frame are being fetched, partial frame signals concerning the (N−1)-th frame are read out for data processing.

Figure 12:
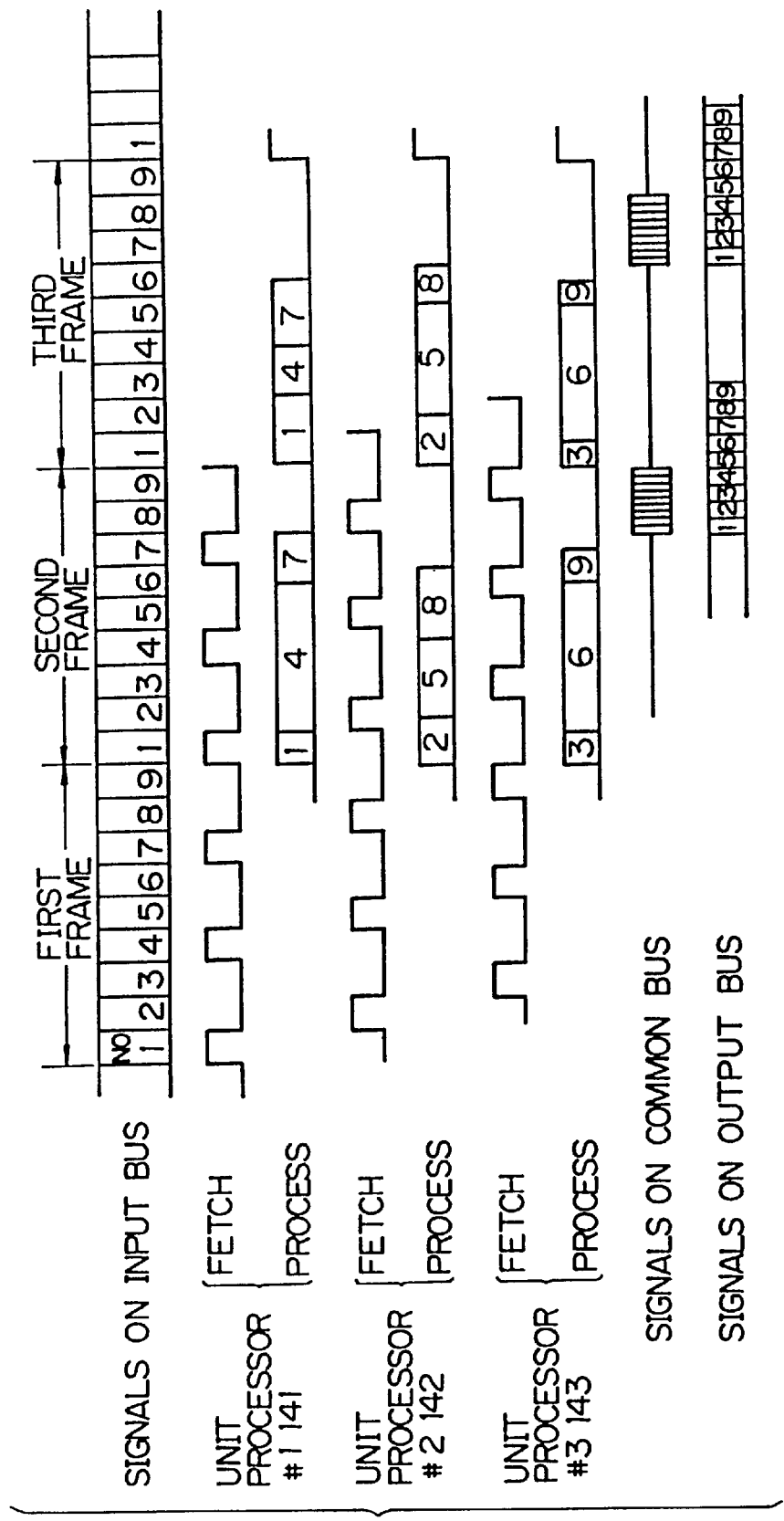
FIGS. 12 and 13 are timing charts showing the operation of the embodiment shown in FIG. 10.

The operation of this embodiment will next be explained with reference to the operation timing chart shown in FIG. 12.

Figure 16:
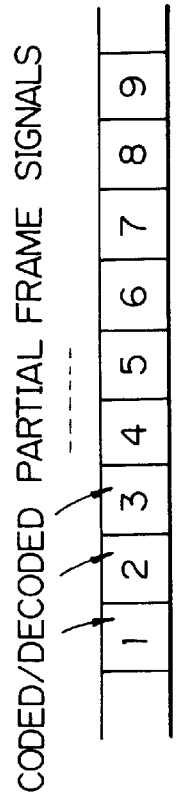
FIG. 16 shows the transfer order of input image auxiliary signals in the embodiment shown in FIG. 10.
Figure 19:
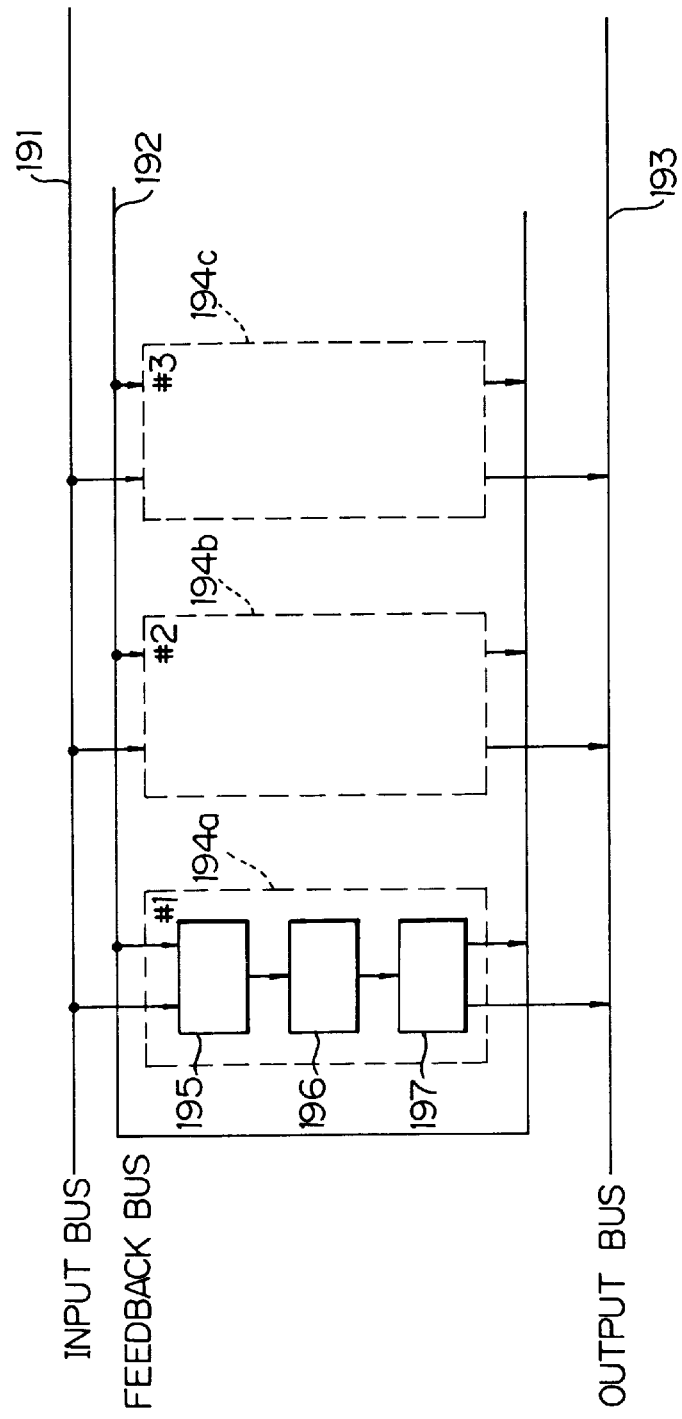
FIG. 19 is a block diagram showing a conventional image processor.
Figures 18A, 18B:
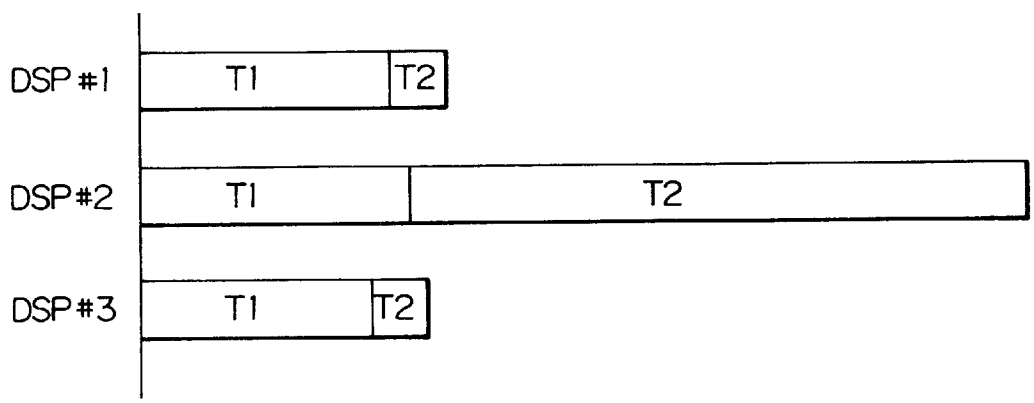
FIG. 18 shows the operation of DMM's employed in a conventional multiprocessor type time varying image encoding system, in which FIG. 18(*a*) shows one example of the division of a picture frame into a plurality of regions in a multiprocessor type time varying image encoding system according to one prior art.

Each of the unit processors #1 to #3 fetches partial frame signals assigned thereto from an input image signal (assumed to be corresponding to a first frame) on the input bus 101 into the fetching unit 105. Upon completion of the fetching of the first frame, the processing units 106 in the unit processors #1 to #3 simultaneously read the partial frame signals from the fetching sections 105 to start the processing. The operation will be explained below with the unit processor #1 141 being taken as an example. The unit processor #1 141 executes the processing for the sectional frame No. 1 to obtain a coded signal and an input image auxiliary signal (i.e., a coded/decoded partial frame signal) and then delivers the coded signal to the output unit 107 and stores the input image auxiliary signal into the storage unit 108 via the local bus 109. Subsequently, the unit processor #1 141 executes the processing for the sectional frames Nos. 4 and 7. The overall processing time of the unit processor #1 for one frame is the sum total of the periods of time required to process the three sectional frames Nos. 1, 4 and 7. Even when the processing time for the sectional frame No. 4, for example, is relatively long, as shown in FIG. 12, if the processing time for the sectional frames Nos. 1 and 7 is relatively short, the processing periods of time for these three sectional frames average out. Thus, the processing for one frame can be completed with a margin with respect to the period of inputting image signals for one frame. When the processing unit 106 in the unit processor #1 completes the processing, the coded/decoded partial frame signals corresponding to the sectional frames have been stored in the storage unit 108, as shown in FIG. 14. The unit processors #2 and #3 operate in the same way as the above. When the unit processors #1 to #3 complete the processing for the first frame, the transfer control unit 10 serially reads the coded/decoded partial frame signals from the unit processors #1 to #3 to the common bus 111, as shown in FIG. 16. In synchronism with the start of this transfer operation, the resulting coded signals are sent to the output bus 103. When any of the unit processors #1 to #3 finds, among the data on the common bus 111 which has been processed in the other unit processors, data which is needed for it to execute processing for the subsequent frame, the unit processor fetches this data into the fetching unit 108. If the process for each sectional frame needs the coded/decoded partial frame signals concerning the adjacent sectional frames, the coded/decoded signals concerning the sectional frames Nos. 1 to 9 have been stored in the storage unit 108, as shown in FIG. 15, upon completion of the fetching operation.

The transfer of the coded/decoded partial frame signals through the common bus 111 is a simple transfer between memories and can therefore be effected at high speed in comparison to the period (⅟30, ⅟15, ⅟10 sec, etc.) of inputting image signals. Accordingly, the processing for the first frame and the transfer of the resulting signals through the common bus 111 can be completed while the image signals for the second frame are being inputted, and the processing for the second frame is started when the inputting of the image signals for the second frame is completed, as shown in FIG. 12.

Figure 13:
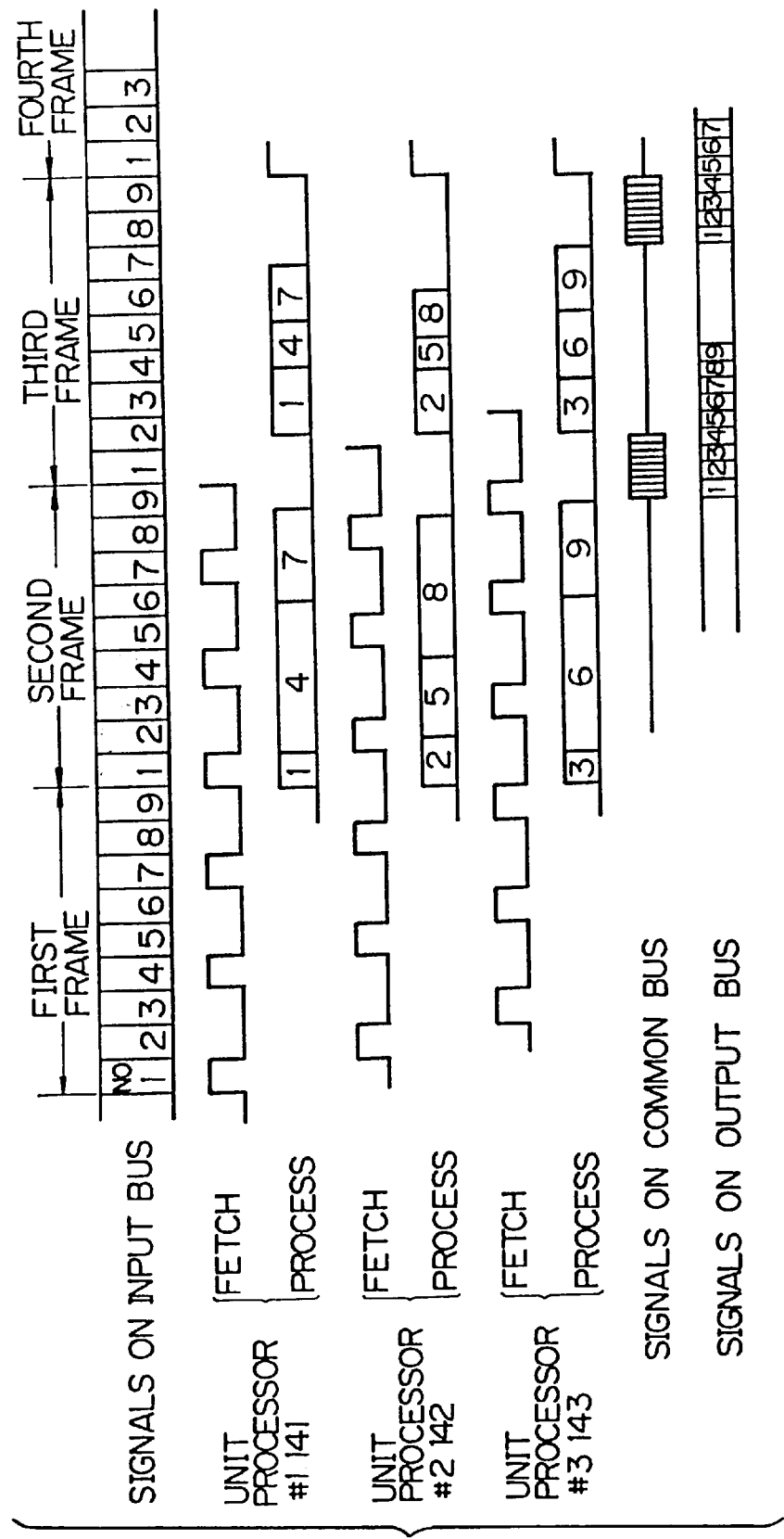

If the sum total of the processing time for the first frame and the transfer of the coded/decoded partial frame signals, which are the input image auxiliary signals, through the common bus 111 exceeds the period of inputting input image signals, the processing for the input image signals corresponding to the second frame is started after the completion of the transfer of the coded/decoded partial frame signals, as shown in FIG. 13. Thus, when the processing time for the input image signals is short, the processing for the input image signals corresponding to the second frame and the transfer of the resulting signals can be completed before the completion of the fetching of the input image signals corresponding to the third frame. Accordingly, the periods of time required for processing the input image signals corresponding to the first and second frames can be evened out, so that there is no danger that the delay in the processing for the first frame will affect the processing for the third frame.

Thus, according to the present invention, each unit processor is in charge of processing image signals corresponding to a plurality of sectional frames which are not contiguous but separated from each other. The processing of the fetched partial frame signals is executed while the input image signals corresponding to the subsequent frame is being fetched. In addition, the delivery of the coded signals to the output bus and the transfer of the input image auxiliary signal from one unit processor to another unit are executed upon completion of the processings carried out in all the unit processors. Accordingly, even when the processing time for the partial image signal corresponding to one sectional frame assigned to one unit processor is relatively long, if the processing time for the partial image signal corresponding to another sectional frame is relatively short, the processing periods of time in one frame average out. Thus, even if the processing of the input image signals for one frame exceeds the image signal input period, the excess processing time can be absorbed in the processing for the subsequent frame. It is therefore possible to prevent a lowering in the processing capacity due to a partiality in the nature of the image without the need to increase the number of unit processors used.

What is claimed is:

1. An image processor having a plurality of unit processors which are programmed to be assigned frame regions of one picture frame, said unit processors each comprising:

a fetching unit for fetching input partial image signals corresponding to the frame regions assigned to the unit processor, a processing unit for processing the input partial image signals after all of the input partial image signals corresponding to assigned frame regions have been fetched, means for providing the processed signals to an output bus, wherein each of said unit processors is assigned a plurality of frame regions which are not contiguous to each other, and means for causing all the unit processors to simultaneously start processing the input partial image signals after all of the input partial image signals corresponding to the assigned frame regions have been fetched.

2. An image processor according to claim 1, wherein each of said unit processors has a storage unit for storing a signal processed therein, and the processed signal stored in said storage unit is read out to a common bus by a transfer control unit after completion of the signal processing operations in all said unit processors in such a manner that the readout signal can be fetched by another unit processor.

3. An image processor comprising:

a plurality of unit processors, at least some of which are programmed to be assigned to a plurality of non-contiguous frame regions for each frame, each of said unit processors comprising:

a fetching unit for fetching input partial image signals corresponding to the assigned non-contiguous frame regions;

a processing unit for processing the input partial image signals after all of the input partial image signals corresponding to assigned frame regions have been fetched, and means for outputting the processed input partial image signals.

4. The image processor of claim 3 wherein each of the unit processors is assigned a plurality of non-contiguous frame regions.

5. The image processor of claim 4 further comprising means for starting processing of the input partial image signals simultaneously after all the signals corresponding to the assigned frame regions have been fetched.

6. The image processor of claim 5 further comprising a transfer control unit, wherein each of the unit processors further comprises a storage unit for storing signals processed by the unit processor, said stored signals being read out to a common bus by the transfer control unit after the signal processing in all said unit processors is completed, so that the signals read out can be fetched by the fetching unit of another unit processor.

7. A method for processing an image frame with a processor having a plurality of unit processors, the frame having frame regions, wherein each of the unit processors has a memory for storing a program which includes information concerning which frame regions are assigned to which unit processor, said method comprising the following steps:

assigning a plurality of non-contiguous frame regions to at least some of the unit processors by storing information concerning which frame regions are assigned to the unit processors in the memories of the unit processors;

fetching input signals corresponding to the plurality of frame regions;

processing each of the frame regions, after all of the input signals corresponding to the frame regions assigned to a unit processor have been fetched, resulting in processed signals; and outputting the processed signals.

8. The method of claim 7 wherein each of the unit processors is assigned a plurality of non-contiguous frame regions.

* * * * *